(12) United States Patent
Baino et al.

(10) Patent No.: US 8,649,926 B2
(45) Date of Patent: Feb. 11, 2014

(54) CONSTRUCTION MACHINE AND CONTROL METHOD THEREOF

(75) Inventors: Makoto Baino, Kobe (JP); Soichirio Bando, Kobe (JP); Hidekazu Matsuba, Akashi (JP)

(73) Assignees: Kawasaki Jukogyo Kabushiki Kaisha, Kobe-shi (JP); Kabushiki Kaisha KCM, Hyogo (JP)

( * ) Notice: Subject to any disclaimer, the term of this patent is extended or adjusted under 35 U.S.C. 154(b) by 84 days.

(21) Appl. No.: 13/115,656

(22) Filed: May 25, 2011

(65) Prior Publication Data

US 2012/0004797 A1 Jan. 5, 2012

(30) Foreign Application Priority Data

May 25, 2010 (JP) ................................ 2010-119785

(51) Int. Cl.
*B60L 9/00* (2006.01)
*B60L 11/00* (2006.01)
*G05D 1/00* (2006.01)
*G05D 3/00* (2006.01)
*G05D 7/00* (2006.01)
*G05D 17/00* (2006.01)

(52) U.S. Cl.
USPC ..... 701/22; 180/65.21; 180/65.29; 318/400.3

(58) Field of Classification Search
USPC .......................... 180/65.21, 65.29; 318/400.3
See application file for complete search history.

(56) References Cited

U.S. PATENT DOCUMENTS

| | | | | |
|---|---|---|---|---|
| 5,564,998 A | * | 10/1996 | Fellows | 475/216 |
| 5,632,703 A | * | 5/1997 | Wilkes et al. | 475/211 |
| 5,700,219 A | * | 12/1997 | Ohkubo | 475/47 |
| 6,157,147 A | * | 12/2000 | Lin | 318/9 |
| 6,170,587 B1 | * | 1/2001 | Bullock | 180/69.6 |
| 6,346,784 B1 | * | 2/2002 | Lin | 318/9 |
| 6,497,634 B1 | * | 12/2002 | Bode et al. | 475/211 |
| 6,852,054 B2 | * | 2/2005 | Tumback et al. | 475/5 |
| RE38,887 E | * | 11/2005 | Bode et al. | 475/211 |
| 7,582,033 B2 | * | 9/2009 | Kefti-Cherif et al. | 475/5 |
| 8,261,550 B2 | * | 9/2012 | Sartre | 60/607 |
| 2003/0178953 A1 | * | 9/2003 | Tumback et al. | 318/8 |
| 2011/0092334 A1 | * | 4/2011 | Baino et al. | 477/5 |

FOREIGN PATENT DOCUMENTS

| | | | |
|---|---|---|---|
| DE | 10200603965 | * | 3/2007 |
| JP | A-08-135762 | | 5/1996 |
| JP | 09-14385 A | * | 1/1997 |
| JP | A-09-014385 | | 1/1997 |
| JP | A-2008-247269 | | 10/2008 |
| JP | 2011245948 | * | 12/2011 |
| JP | 2011245948 A | * | 12/2011 |

* cited by examiner

*Primary Examiner* — James P Trammell
*Assistant Examiner* — Jean-Paul Cass
(74) *Attorney, Agent, or Firm* — Oliff PLC

(57) ABSTRACT

A construction machine comprises an electric motor/generator; an engine; an epicyclic gearing for rotating the electric motor/generator reversely when speed of a rotation output to a drive wheel is zero during running of the engine; a transmission configured to switch between a forward driving gear position and a backward driving gear position; and a controller for controlling the engine, the electric motor/generator and the transmission, based on at least an accelerator opening, and a state of charge in an electric storage device; the controller being configured to switch the forward driving gear position or the backward driving gear position to a direction opposite to a direction in which the construction machine is moving, and cause the electric motor/generator to generate reverse torque in a power running mode, when the electric storage device is in a fully charged state and the accelerator has been pressed down by a driver.

9 Claims, 21 Drawing Sheets

CONSTRUCTION MACHINE AND CONTROL METHOD THEREOF

CROSS REFERENCE TO THE RELATED APPLICATION

Japanese Patent Application No. 2007-93006 (U.S. patent application Ser. No. 12/580,161) and Japanese Patent Application No. 2010-119785, including specification, drawings and claims are incorporated herein by reference in its entirety.

BACKGROUND OF THE INVENTION

1. Field of the Invention

The present invention generally relates to a hybrid construction machine including an engine and an electric motor/generator. More particularly, the present invention relates to a control technique suitable for wheel loaders and similar construction machines, which frequently generate great traction forces at very low speed.

2. Description of the Related Art

Japanese Laid-Open Patent Application Publication No. Hei. 9-14385 discloses a conventional hybrid vehicle including an internal combustion engine and an electric motor, as a driving power source, in which an output shaft of the engine is coupled to a sun gear of an epicyclic gearing, an output shaft of the electric motor is coupled to a ring gear of the epicyclic gearing, and a composite output of the output shafts of the engine and of the electric motor is output to a drive wheel through a planetary carrier.

In this hybrid vehicle, a rotation of the carrier coupled to the drive wheel side stops during a stopped state of the vehicle (i.e., output rotational speed is zero), while idle rotation of the engine is input to the sun gear, causing the ring gear and the electric motor coupled to the ring gear to rotate reversely (in a reverse direction). In this state, the electric motor performs regenerative braking, stops its reverse rotation smoothly, and shifts to a power running mode in which it rotates normally (in a normal direction). Thus, the vehicle smoothly starts.

Unlike a driving pattern of the above mentioned vehicle, wheel loaders and similar construction machines do not frequently drive continuously at constant vehicle speed which is not less than certain speed. A large part of the operation of the wheel loader is a V cycle operation. For example, the wheel loader starts and drives toward dirt (earth) and shovels the dirt. Then, the wheel loader drives backward and then drives forward toward a truck. Thus, the wheel loader accelerates and decelerates repeatedly at low speed. When the construction machine is shoveling the dirt, a great traction force is needed in a very low-speed range, which is referred to as a stall state.

Under the circumstances, typically, wheel loaders of medium and larger sizes are equipped with torque converters. It is well known that the torque converter has a low efficiency as a whole and a very low efficiency particularly in a low-speed ratio. The torque of the torque converter cannot be transmitted sufficiently when engine speed is low. Such a characteristic of the torque converter is not always suitable for the above mentioned driving pattern of the wheel loader such as repeated acceleration and deceleration, stall, etc.

To solve the above problem, inventors studied intensively to provide hybrid construction machines such as the wheel loader which is not equipped with the torque converter, and conceived a structure in which an epicyclic gearing composites a driving power of an electric motor/generator and a driving power of an engine and outputs the resulting composite driving power to drive wheels, and a transmission is provided between the epicyclic gearing and the drive wheel (see Japanese Laid-Open Patent Application Publication No. 2008-247269).

In this construction machine, to attain a driving capability which is equal to or higher than that of the torque converter when a direct-coupling clutch is disengaged in a low-speed range, engine speed is controlled according to a state of charge (SOC) in an electric storage device, an operation of the electric motor/generator switches properly between power running and regenerative braking by controlling upshifting or downshifting of a transmission gear position. This enables the construction machine to drive while performing electric charging and electric discharging repeatedly within a limited electricity capacity of the electric storage device while maintaining a balance between engine torque and electric motor/generator torque. As a result, a good driving capability is attained.

SUMMARY OF THE INVENTION

In the hybrid construction machine disclosed in Japanese Laid-Open Patent Application Publication No. 2008-247269, as shown in FIG. 1 and the like, the driving power output from the engine is input to the sun gear of the epicyclic gearing, the driving power of the electric motor/generator is input to the ring gear, and the composite driving power is output through the planetary carrier. As shown in FIGS. 6 to 8 and the like in this Prior Art, during a period of time from when the construction machine in a stopped state (vehicle speed is zero) starts until vehicle speed of the construction machine reaches predetermined vehicle speed, the ring gear connected to the electric motor/generator rotates reversely.

During this period of time, the electric motor/generator generates torque (normal torque) in a normal rotation direction, to counter the reverse rotation, and generates electric power in a regenerative braking mode. However, for example, in a state where the electric storage device is fully charged, i.e., a large amount of electricity is stored in the electric storage device, excessive electric charging must be inhibited, and therefore the electric motor/generator must be inhibited from generating electric power. In other words, during the state where the electric storage device is fully charged, the hybrid construction machine cannot start or drive at very low speed, and tends to be put in a failure-to-function state.

As described above, in the wheel loaders and similar construction machines, a situation where a great traction force is generated at very low speed frequently occurs, for example, when the construction machine is shoveling dirt. In this situation, as stated above, the electric motor/generator is generating electric power in the regenerative braking mode. Therefore, the electric storage device is more likely to store a large amount of electricity, and the hybrid construction machine tends to be put in a failure-to-function state.

The present invention addresses the above described conditions, and an object of the present invention is to provide a construction machine capable of starting and driving at very low speed even when a large amount of electricity is stored in an electric storage device, for example, even in a case of a fully-charged state of the electric storage device, and a method of controlling the construction machine.

To achieve the above object, in the present invention, the driving gear position of the transmission is switched to the forward or backward driving gear position opposite to the direction in which the construction machine is moving, when a large amount of electricity is stored in the electric storage device and the electric motor/generator is caused to rotate reversely in the power running mode, thereby enabling the construction machine to start and drive at very low speed.

According to an aspect of the present invention, a construction machine comprises an electric motor/generator coupled to an electric storage device and configured to generate a driving power; an engine configured to generate a driving power; an epicyclic gearing for compositing the driving power output from the electric motor/generator and the driving power output from the engine and outputting a composite driving power to a drive wheel, the epicyclic gearing being configured to cause the electric motor/generator to rotate reversely when speed of a rotation output to the drive wheel is zero during running of the engine; a transmission provided on a driving power transmission path between the epicyclic gearing and the drive wheel and configured to switch between a forward driving gear position and a backward driving gear position; and a controller for controlling the engine, the electric motor/generator and the transmission, based on at least an accelerator opening, and a state of charge (SOC) in the electric storage device; the controller being configured to switch the driving gear position of the transmission to the forward or backward driving gear position opposite to a direction in which the construction machine is moving, and cause the electric motor/generator to generate reverse torque in a power running mode, when the electric storage device is in a fully charged state in which the state of charge (SOC) is not less than a predetermined amount and the accelerator has been pressed down by a driver. As used herein, the term "reverse torque" refers to torque corresponding to a predetermined reverse rotation direction of the electric motor/generator rotatable normally (in a normal direction) and reversely (in a reverse direction).

In a state where the construction machine so configured is in a stopped state or driving at very low speed, a rotation (normal rotation) of the engine is input to the epicyclic gearing and speed of the rotation output to the drive wheel becomes zero or close to zero, so that the electric motor/generator rotate reversely. Under this state, if the accelerator has been pressed down and the state of charge (SOC) in the electric storage device is not less than a predetermined amount, the controller switches the driving gear position of the transmission to the forward or backward driving gear position opposite to the direction in which the construction machine is moving, and the electric motor/generator generates reverse torque (see, for example, FIG. 25).

Since the electric motor/generator rotating reversely and generating the reverse torque is put in the power running mode (i.e., reverse rotation power running state), the electric storage device is discharged. Thus, a problem will not arise even in a state where the electric storage device is fully charged. Although the rotation output from the epicyclic gearing increases in a reverse rotation direction by the reverse rotation power running performed by the electric motor/generator, the driving gear position of the transmission receiving the rotation output from the epicyclic gearing is switched to the forward or backward driving gear position opposite to the direction in which the construction machine is moving, and therefore the construction machine moves in the direction in which the construction machine is moving. At this time, the engine is applied with a force for accelerating the engine in a normal rotation direction, i.e., the engine generates an engine braking force.

Preferably, the construction machine may further comprise an engine brake control unit for controlling a magnitude of an engine braking force; and the engine brake control unit may enhance the engine braking force when the construction machine starts and drives in a state where the driving gear position of the transmission has been switched, and the electric motor/generator rotates reversely in the power running mode. This makes it possible to suppress a degree to which the engine revolves up. By controlling the magnitude of the engine braking force based on the accelerator opening, etc., the construction machine can implement a good driving capability in which the vehicle speed increases smoothly with high responsiveness to the driver's accelerator operation.

As the engine brake control unit, a hydraulic pump drivably coupled to the engine may be used. In general, the hydraulic pump is built into the construction machine as a hydraulic source for driving a loading system, a steering system and others. By controlling the output pressure (output flow rate as necessary) of the hydraulic pump, the magnitude of a rotation burden placed on the engine can be controlled.

When the vehicle speed increases and exceeds a predetermined value, after the driving gear position of the transmission is switched to the forward or backward driving gear position opposite to the direction in which the construction machine is moving, and the electric motor/generator rotates reversely in the power running mode, and the construction machine starts, the driving gear position may be returned to the direction in which the construction machine is moving, and the electric motor/generator may generate normal torque and maintain the power running mode. Thereafter, when the state of charge (SOC) in the electric storage device is deficient, the transmission gear position is upshifted, thereby causing the electric motor/generator to generate the electric power in the regenerative braking mode.

Or, the driving gear position may be returned to the direction in which the construction machine is moving, and the electric motor/generator may shift to the regenerative braking mode, when the state of charge (SOC) in the electric storage device decreases to a predetermined amount or less by the power running operation of the electric motor/generator before the vehicle speed reaches the predetermined vehicle speed.

Except for cases where the construction machine is in a stopped state or a very low speed state where the vehicle speed is not more than a predetermined value, the engine, the electric motor/generator, and the transmission may be controlled like a configuration disclosed in Japanese Laid-Open Patent Application Publication No. 2008-247269. For example, the engine speed may be set relatively higher when the accelerator is being pressed down and the state of charge (SOC) in the electric storage device is relatively small, while the engine speed may be set relatively lower when the accelerator is being pressed down and the state of charge (SOC) in the electric storage device is relatively large.

Regarding the transmission, the transmission gear position may be upshifted when the accelerator is being pressed down, the electric motor/generator is in the power running mode and the state of charge (SOC) in the electric storage device is relatively small, while the transmission gear position may be downshifted when the accelerator is being pressed down, the electric motor/generator is in the regenerative braking mode and the state of charge (SOC) in the electric storage device is relatively large.

According to another aspect of the present invention, a method of controlling a construction machine including an electric motor/generator coupled to an electric storage device and configured to generate a driving power; an engine configured to generate a driving power; an epicyclic gearing for compositing the driving power output from the electric motor/generator and the driving power output from the engine and outputting a composite driving power to a drive wheel, the epicyclic gearing being configured to cause the electric motor/generator to rotate reversely when speed of a rotation output to the drive wheel is zero during running of the engine; a transmission provided on a driving power transmission path between the epicyclic gearing and the drive wheel and configured to switch between a forward driving gear position and a backward driving gear position; and a controller for controlling the engine, the electric motor/generator and the transmission, based on at least an accelerator opening, and a state of charge (SOC) in the electric storage device; the method comprising: switching the driving gear position of the transmission to the forward or backward driving gear position opposite to a direction in which the construction machine is moving, and cause the electric motor/generator to generate reverse torque in a power running mode, using the controller, when the electric storage device is in a fully charged state in which the state of charge (SOC) is not less than a predetermined amount and the accelerator has been pressed down by a driver.

Preferably, in the method, the construction machine may further include an engine brake control unit for controlling a magnitude of an engine braking force, and the method may comprise enhancing the engine braking force using the engine brake control unit to receive reactive force torque of the electric motor/generator which is applied in a direction opposite to a normal direction, when the driving gear position of the transmission is switched to the forward or backward driving gear position opposite to the direction in which the construction machine is moving.

Preferably, the method may comprises switching back the driving gear position of the transmission to the direction in which the construction machine is moving, and causing the electric motor/generator to generate normal torque in a regenerative braking mode, using the controller, when the state of charge (SOC) in the electric storage device decreases to a predetermined set amount or less, in a state where the driving gear position of the transmission is switched to the forward or backward driving gear position opposite to the direction in which the construction machine is moving.

The above and further objects and features of the invention will more fully be apparent from the following detailed description with accompanying drawings.

DETAILED DESCRIPTION OF THE PREFERRED EMBODIMENTS

Hereinafter, a preferred embodiment of the present invention will be described with reference to the drawings.

[Schematic Configuration of Drive System]

Figure 1:
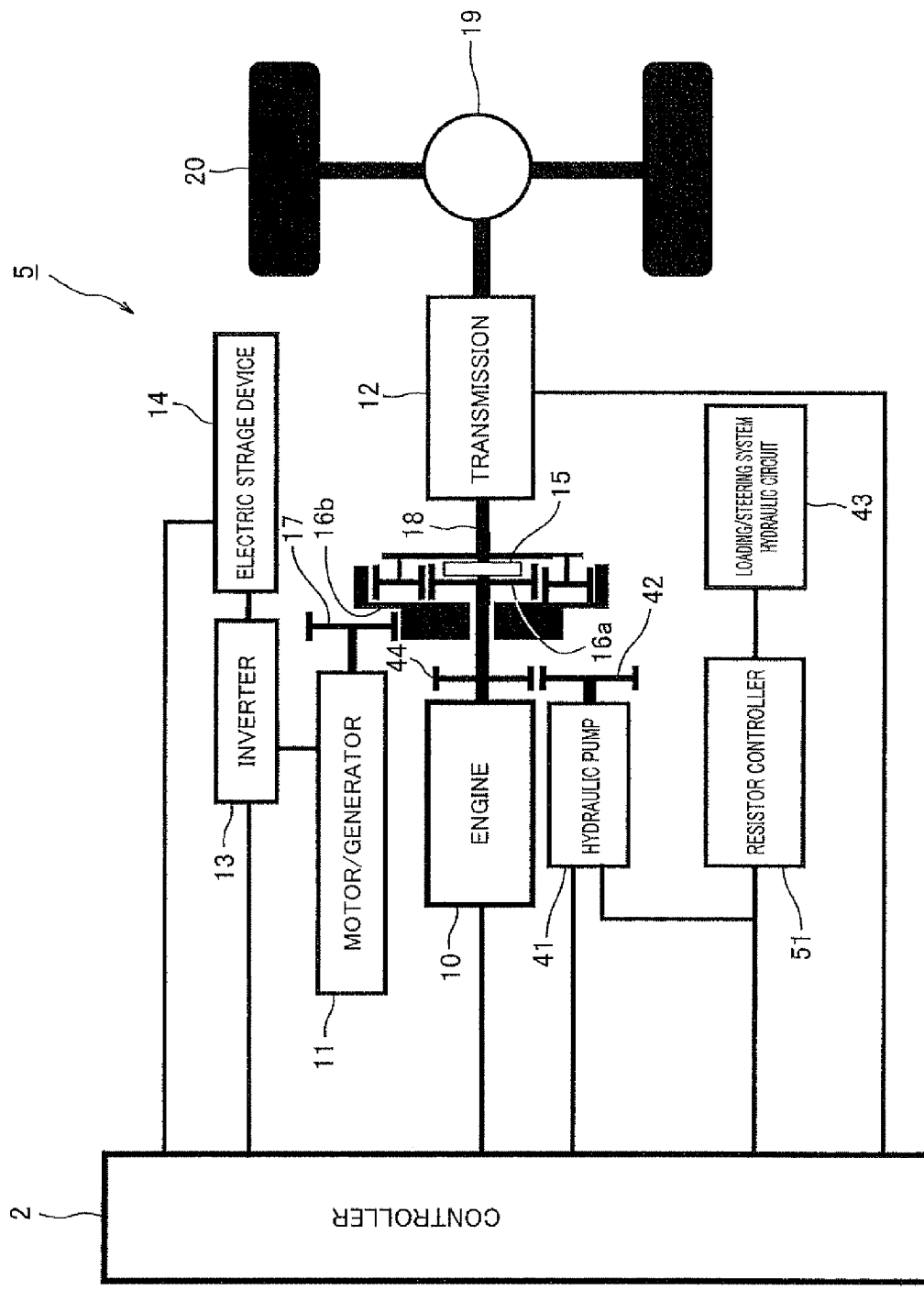
FIG. 1 is a block diagram showing a configuration of a drive system in a construction machine according to an embodiment of the present invention.

FIG. 1 is a block diagram showing a configuration of a drive system in a construction machine 1 according to an embodiment of the present invention. Turning now to FIG. 1, the construction machine 1 comprises an engine 10 and an electric motor/generator 11, as a driving power source. The construction machine 1 includes a hybrid drive system in which an epicyclic gearing composites a driving power of the engine 10 and a driving power of the electric motor/generator 11, and outputs the resulting composite driving power to drive wheels 20.

In the example of FIG. 1, the output shaft of the engine 10 is coupled to a sun gear 16a of the epicyclic gearing, while the output shaft of the electric motor/generator 11 is coupled to a gear 17 coupled to a ring gear 16b of the epicyclic gearing. A carrier 18 of the epicyclic gearing is coupled to a transmission 12 which is electronically controlled to perform automatic shifting between plural gear positions. The transmission 12 is coupled to the drive wheels 20 via a differential gear 19. Between the sun gear 16a and the carrier 18, a direct-coupling clutch 15 is provided. By engagement of the direct-coupling clutch 15, a driving power of the engine 10 is directly transmitted to the transmission 12. As used herein, the term "direct-coupling clutch" refers to a clutch for mechanically coupling an input shaft to an output shaft using a fluid.

Alternatively, the transmission 12 may be directly coupled to the drive wheels 20 without via the differential gear 19. In addition, a configuration for coupling the engine 10, the electric motor/generator 11, and the drive wheels 20, to rotational elements of epicyclic gearing, i.e., the sun gear 16a, the ring gear 16b and the carrier 18 is not limited to the above configuration.

The electric motor/generator 11 is coupled to an electric storage device 14 via an inverter 13. The electric motor/generator 11 is supplied with electric power from the electric storage device 14 and operates as an electric motor (power running mode), or operates as a generator (regenerative braking mode) to charge the electric storage device 14. The electric motor/generator 11 is capable of rotating normally (in a normal direction) and reversely (in a reverse direction) as will be described with reference to FIG. 17. The electric motor/generator 11 is configured to switch between the power running mode and the regenerative braking mode depending on whether the electric motor/generator 11 is rotating normally or reversely. This switching operation of the electric motor/generator 11 is executed by a controller 2 via the inverter 13.

The construction machine 1 according to this embodiment includes a hydraulic pump 41 for driving a loading system including loading devices such as a bucket and an arm, or a steering system (not shown) and a loading/steering system hydraulic circuit 43 for feeding a hydraulic oil (pressurized oil) from the hydraulic pump 41 to an actuator and for discharging it from the actuator. The hydraulic pump 41 is drivably coupled to the output shaft of the engine 10 by gears 42 and 44. Between the hydraulic pump 41 and the loading/steering system hydraulic circuit 43, a resistor controller 51 is provided. The resistor controller 51 is configured to cause the hydraulic pump 41 to serve as an engine brake control unit, as will be described specifically later.

Figure 2:
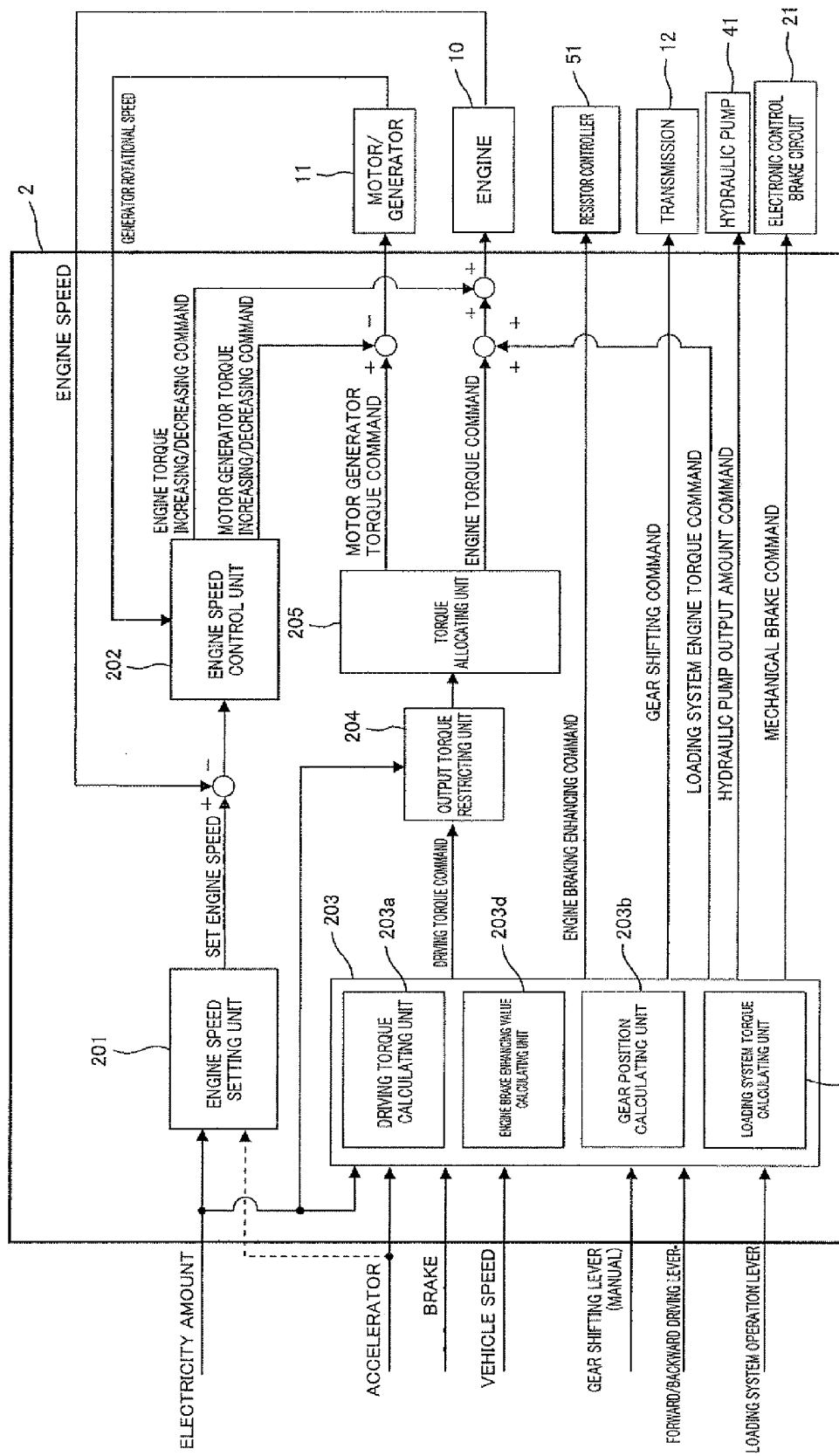
FIG. 2 is a functional block diagram showing a configuration of a controller in the construction machine.

The construction machine 1 further comprises a controller 2 configured to control in a comprehensive manner, the operation of the engine 10, the operation of the electric motor/generator 11 and the operation of the transmission 12 such that these components operate properly in conjunction with each other. FIG. 2 is a functional block diagram showing a configuration of the controller 2. Turning to FIG. 2, the controller 2 receives, as inputs, the state of charge (SOC) in the electric storage device 14, input from an accelerator, input from a brake pedal, vehicle speed of the construction machine 1, the rotational speed and torque (corresponding to the electric charging amount and electric discharging amount in the electric storage device 14) of the electric motor/generator 11, the engine speed, and the lever positions of several levers such as a transmission lever, a forward/backward driving lever, and a loading system lever.

An engine speed setting unit 201 in the controller 2 is configured to set the engine speed based on the state of charge (SOC) in the electric storage device 14 and the input from the accelerator (an accelerator opening). An engine speed control unit 202 in the controller 2 is configured to receive as inputs, the set engine speed which is set by the engine speed setting unit 201, actual engine speed, and actual rotational speed of the electric motor/generator 11, to calculate torque required for the engine 10 and torque required for the electric motor/generator 11 based on these inputs, and to output the calculated values indicating an engine torque increasing/decreasing command and an electric motor/generator torque increasing/decreasing command.

A driving torque calculating unit 203a in a calculating unit 203 is configured to calculate driving torque required for driving of the construction machine 1 based on the input from the accelerator, the input from the brake pedal, etc., and to output the calculated value indicating a driving torque command. An output torque restricting unit 204 is configured to receive the driving torque command from the driving torque calculating unit 203a, modify the driving torque command, and output the modified driving torque command to the torque allocating unit 205, to restrict the driving power of the electric motor/generator 11 under specified situations. Alternatively, the output torque restricting unit 204 may be omitted, and the driving torque calculating unit 203a may be configured to directly output the driving torque command to the torque allocating unit 205.

In this embodiment, the driving torque calculating unit 203a is configured to calculate and output the driving torque required for the driving based on the input from the accelerator, and the input from the brake pedal. Therefore, it is possible to avoid the event in which an energy is wasted by applying a driving power in the state where the brake is actuated, or the brake is excessively burdened.

The torque allocating unit 205 calculates a ratio between the torque to be generated in the electric motor/generator 11 and the torque to be generated in the engine 10 based on the driving torque command as described later, and outputs the electric motor/generator toque command and the engine torque command to the electric motor/generator 11 and to the engine 10, respectively. A signal which is a sum of the electric motor/generator torque increasing/decreasing command output from the engine speed control unit 202 and the electric motor/generator torque command is input to the electric motor/generator 11. A signal which is a sum of the engine torque increasing/decreasing command and the engine torque command is input to the engine 10.

A gear position calculating unit 203b in the calculating unit 203 calculates a transmission gear position, based on the input from the accelerator, the state of charge (SOC) in the electric storage device 14, and the operational state (regenerative braking mode or power running mode) of the electric motor/generator 11 as described later and outputs to the transmission 12 a gear position shifting command indicating whether or not upshifting or downshifting of the transmission gear position is necessary, based on the calculated value. In this embodiment, the gear position calculating unit 203b also outputs a gear position changing command for switching the transmission 12 between a forward driving gear position and a backward driving gear position according to the position of the forward/backward driving lever, and further outputs a gear position changing command for switching the driving gear position of the transmission 12 to the forward or backward driving gear position opposite to a direction in which the construction machine 1 is moving, as necessary, in a state where the electric storage device 14 is fully charged, as described later.

As shown in FIG. 1, the calculating unit 203 includes a loading system torque calculating unit 203c and an engine brake enhancing value calculating unit 203d. The loading system torque calculating unit 203c calculates torque required for the hydraulic pump 41 to drive the loading system or the steering system, and outputs the calculated value indicating a loading system engine torque command. The output loading system engine torque command is added to the engine torque command output from the torque allocating unit 205.

The engine brake enhancing value calculating unit 203d calculates a value of a magnitude of a desired engine braking force during control in a state where the electric storage device 14 is fully charged as described later, and outputs to the resistor controller 51 the calculated value indicating an engine brake enhancing value command.

The calculating unit 203 outputs a mechanical brake command to an electronic control brake circuit 21 configured to control a mechanical brake, to avoid degradation of a driver's steering feeling which is caused by the fact that a clutch is turned off (disengaged) and deceleration is diminished (torque is free) when the transmission gear position is shifted during the deceleration. This enables the auxiliary use of the mechanical brake. As a result, the driver's steering feeling can be kept good even when the torque free state occurs in the deceleration when driving is switched between the forward driving and the backward driving (switch back).

[Basic Control for Drive System]

In this embodiment, the basic control for the drive system of the construction machine 1 is such that the driving torque calculating unit 203a calculates a desired driving power from the input from the accelerator and the vehicle speed, and the torque allocating unit 205 determines a ratio between the torque allocated to the electric motor/generator 11 and the torque allocated to the engine 10 (they are determined based on the gear ratio of the epicyclic gearing), and outputs them to the electric motor/generator 11 and to the engine 10, respectively.

To be specific, if the accelerator is released by the driver under the state where the construction machine 1 is in a stopped state, the engine speed usually becomes idling engine speed. However, according to this embodiment, the engine speed is basically independent of the input from the accelerator, and is set primarily based on the state of charge (SOC) in the electric storage device 14. The reason is as follows. Under the same transmission gear position, as the engine speed is lower, upper limit vehicle speed (to be precise, vehicle speed at a transition point between the regenerative braking and the power running, and hereinafter referred to as transition vehicle speed) which is associated with the regenerative braking (electric power generation) of the electric motor/generator 11 is lower, while as the engine speed is higher, the transition vehicle speed is correspondingly higher. If the vehicle speed is above this transition vehicle speed, the electric motor/generator 11 shifts to the power running mode. However, because of the limited state of charge (SOC) in the electric storage device 14, the power running mode cannot continue for a long period of time.

Accordingly, in this embodiment, by setting the engine speed based on the state of charge (SOC) as described later, the control is executed so that the state of charge (SOC) is optimal in a regenerative braking range and in a power running range of the electric motor/generator 11. As stated above, the transition vehicle speed changes according to the engine speed. In addition, the transition vehicle speed changes according to the transmission gear position of the transmission 12. For example, when the transmission gear position is upshifted, the output shaft rotational speed of the transmission 12 becomes higher, even if the input shaft rotational speed of the transmission 12 is equal, and correspondingly the transition vehicle speed increases. Accordingly, in this embodiment, the engine speed and the transmission gear position are controlled so that the electricity amount in the electric storage device 14 is optimal according to the vehicle speed.

[Process for Setting Engine Speed]

Subsequently, a specific process which is performed by the engine speed setting unit 201, the gear position calculating unit 203b, and the torque allocating unit 205, will be specifically described with reference to the flow chart and others. It should be noted that the process occurs during driving in a low-speed range in which the clutch 15 is in an off-state (disengaged), for example, during the V cycle operation of the wheel loader in which acceleration and deceleration are repeated or switch back is repeated, for example.

Figure 3:
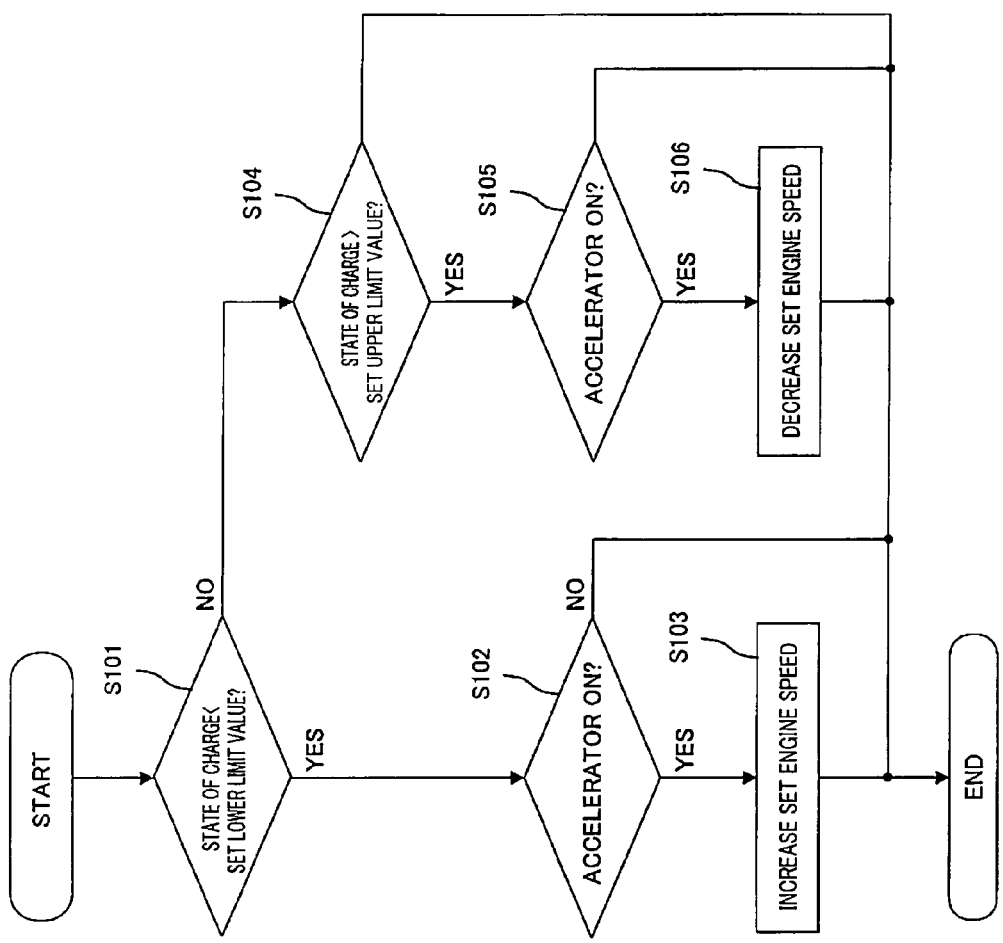
FIG. 3 is a flowchart showing a process of setting engine speed which is executed by the controller.

FIG. 3 is a flowchart showing the calculation process of the set engine speed which is executed by the engine speed setting unit 201. Turning to FIG. 3, initially, the engine speed setting unit 201 determines whether or not the state of charge (SOC) in the electric storage device 14 is smaller than a preset lower limit value (set lower limit value) of the state of charge (SOC) (S101). If it is determined that the state of charge (SOC) is smaller than the set lower limit value (YES in S101), i.e., the state of charge (SOC) is deficient, the engine speed setting unit 201 determines whether or not the accelerator has been pressed down by the driver (the accelerator is turned on) (S102). If it is determined that the accelerator has not been pressed down by the driver (NO in S102), the process terminates, whereas if it is determined that the accelerator has been pressed down by the driver (YES in S102), the set engine speed is increased (S103).

On the other hand, if it is determined that the state of charge (SOC) is not smaller than the set lower limit value in step S101 (NO in S101), i.e., the state of charge (SOC) is sufficient, the engine speed setting unit 201 determines whether or not the state of charge (SOC) in the electric storage device 14 is larger than a preset upper limit value (set upper limit value) of the state of charge (SOC) (S104). If it is determined that the state of charge (SOC) is not larger than the set upper limit value (NO in S104), i.e., the state of charge (SOC) is proper, the process terminates. On the other hand, if it is determined that the state of charge (SOC) is larger than the set upper limit value (YES in S104), the engine speed setting unit 201 determines whether or not the accelerator has been pressed down by the driver (S105). If it is determined that the accelerator has not been pressed down by the driver (NO in S105), the process terminates, whereas if it is determined that the accelerator has been pressed down by the driver (YES in S105), the set engine speed is decreased (S103).

In brief, in a state where the accelerator is being pressed down, if the state of charge (SOC) in the electric storage device 14 is relatively small, the engine speed is increased, while if the state of charge (SOC) in the electric storage device 14 is relatively large, the engine speed is decreased. Through the process, the engine speed can be set appropriately.

It should be noted that in the above engine speed control, only the engine speed is desirably changed so as not to negatively affect the driver's feeling. To this end, it is necessary to change only the engine speed in a state where the electric motor/generator 11 and the engine 10 are generating a driving power according to the amount of press-down of the accelerator. Accordingly, as explained below, the engine speed is increased or decreased by changing a ratio between the engine torque and the electric motor/generator torque while maintaining the torque of the carrier 18 which is the output shaft of the epicyclic gearing at a constant value.

[Ratio Between Engine Torque and Electric/Motor Generator Torque]

Figure 4:
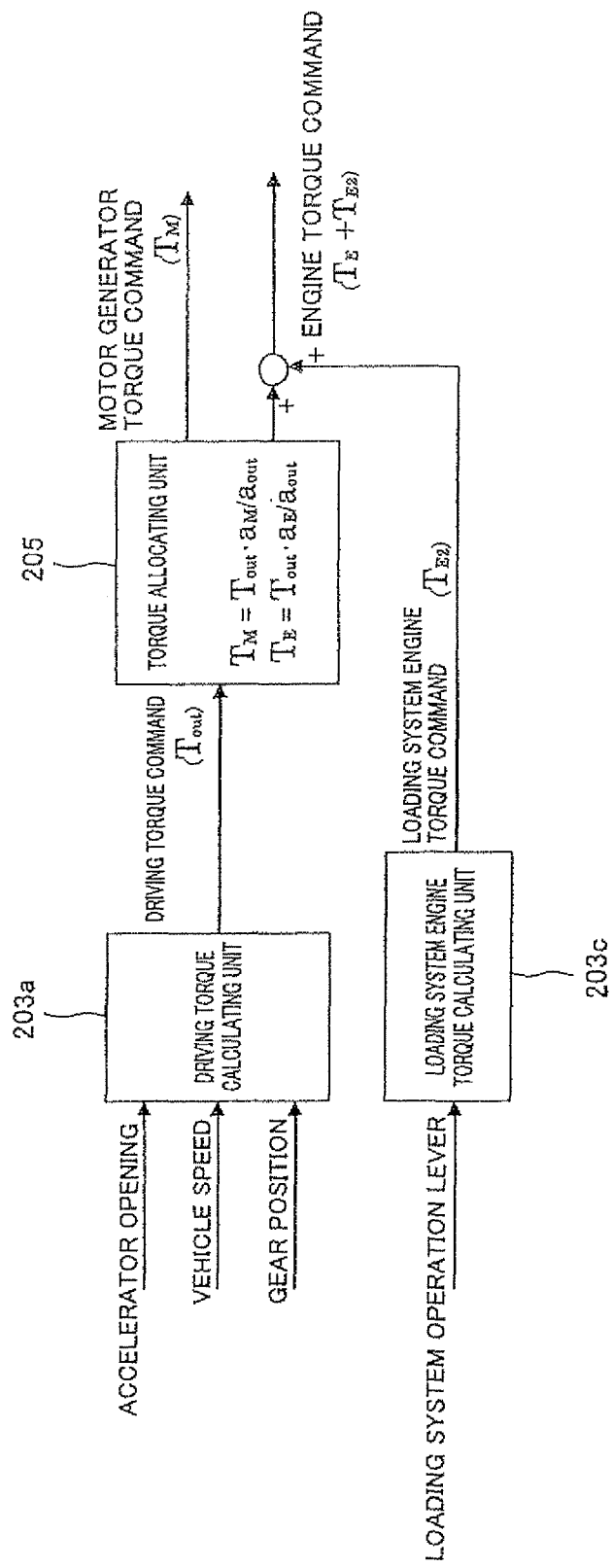
FIG. 4 is a view showing a calculation process of an electric motor/generator torque command and an engine torque command.

FIG. 4 is a view showing an example of the calculation process of the electric motor/generator torque command and the engine torque command which is executed by the torque allocating unit 205. Hereinafter, for easier explanation, it is supposed that the output torque restricting unit 204 is omitted and the driving torque calculating unit 203a and the torque allocating unit 205 are directly coupled to each other. A driving torque command depicted at upper side of FIG. 4 will be described firstly, and then a loading system engine torque command depicted at lower side of FIG. 4 will be described.

Basic formulae of the epicyclic gearing according to which the electric motor/generator torque command and the engine torque command are calculated are shown below.

$$a_E \cdot \omega_E + a_M \cdot \omega_M + a_{out} \cdot \omega_{out} = 0 \quad \text{(first formula: relationship of rotational speed)}$$

$$T_E/a_E = T_M/a_M = T_{out}/a_{out} \quad \text{(second formula: relationship of torque)}$$

$$a_E + a_M + a_{out} = 0 \quad \text{(third formula: relationship of coefficients)}$$

where $\omega_E$, $\omega_M$ and $\omega_{out}$ indicate the rotational speed of the engine (sun gear), the rotational speed of the electric motor/generator (ring gear), and the rotational speed of output gear (carrier), respectively, $T_E$, $T_M$, and $T_{out}$ indicate the torque of the engine (sun gear), the torque of the electric motor/generator (ring gear), and the torque of output shaft (carrier), respectively, and $a_E$, $a_M$, and $a_{out}$ indicate parameters of the epicyclic gearing, respectively.

As shown in FIG. 4, the driving torque calculating unit 203a calculates the torque required for driving based on an accelerator opening, vehicle speed, and a transmission gear position, and outputs to the torque allocating unit 205 the calculated value indicating the driving torque command ($T_{out}$). Receiving the driving torque command ($T_{out}$), the torque allocating unit 205 calculates $T_M = T_{out} \cdot a_M/a_{out}$ and $T_E = T_{out} \cdot a_M/a_{out}$, and outputs the calculated value indicating the electric motor/generator torque command ($T_M$) and the engine torque command ($T_E$) to the electric motor/generator 11 and the engine 10, respectively.

In the case of normal driving which does not require a traction force other than the traction force required for the vehicle to drive, the driving torque is uniquely determined by the accelerator opening and the vehicle speed (including a change rate of the vehicle speed). In calculation of the driving torque, the transmission gear position should be taken into account so that the same acceleration is attained irrespective of the transmission gear position. Thus, the same driving torque command is output and the same acceleration is obtained with equal vehicle speed and an equal accelerator opening even when the transmission gear position is different depending on the state of charge (SOC) in the electric storage device 14. Therefore, the driver need not consider the transmission gear position at that point of time.

On the other hand, in the case of a driving situation in which the traction force is needed, such as pulling of a heavy object or shoveling of dirt (earth), the vehicle speed does not increase even if the driving torque command is output. Therefore, there is a need to increase the driving torque command as desired. In this case, the upper limit value of an integration control incorporated into the driving torque calculation process may be set based on the accelerator opening. With this configuration, when the construction machine 1 is pulling the heavy object or shoveling of the dirt (earth), if the vehicle speed is not increased (stall state) even though the accelerator has been pressed down by the driver, the traction force gradually increases, and its upper limit value is set based on the accelerator opening, thereby attaining a desired traction force by the operation of the accelerator.

In the case of the driving situation in which the traction force is needed as described above, driving in the regenerative braking mode frequently occurs, and the electric power generation state continues. Therefore, as a result of the processing of the gear position calculating unit 203b as described later, downshifting of the transmission gear position is performed and the resulting traction force is increased. In a case where the driver judges that it is necessary to increase the traction force preliminarily in shoveling of dirt, or the like, the driver manually performs downshifting of the transmission gear position, thereby facilitating the work.

When the loading system or the steering system is driven, it is necessary to additionally generate torque for driving the hydraulic pump 41. To this end, the loading system engine torque calculating unit 203c in the calculating unit 203 calculates torque $T_{E2}$ which is required for the hydraulic pump 41, and outputs the calculated value indicating a loading system engine torque command ($T_{E2}$). The loading system engine torque command ($T_{E2}$) is added to the engine torque command ($T_E$) as depicted at lower side of FIG. 4. The resulting engine torque command ($T_E + T_{E2}$) is output to the engine 10. At this time, a pump output amount is calculated and output to the hydraulic pump 41. In addition, the pump output amount is used to calculate the torque required for the hydraulic pump 41.

In this embodiment, the construction machine 1 drives under the condition in which the engine torque and the electric motor/generator torque are kept in a well-balanced manner. For this reason, in the case where the load is applied to the hydraulic pump 41 directly coupled to the engine shaft, it is necessary that the engine torque ($T_E$) required for the drive system and the loading system engine torque ($T_{E2}$) required for the loading system be added to determine the overall engine torque ($T_E + T_{E2}$) as described above.

In the case where the overall engine torque ($T_E + T_{E2}$) is beyond the torque which is capable of being generated by the engine 10, the controller 2 sets the engine torque ($T_E$) and the loading system engine torque ($T_{E2}$) according to a predetermined priority of the drive system and the loading system. The controller 2 performs back calculation of the driving torque command ($T_{out}$) based on the set value of the engine torque ($T_E$) and the set value of the loading system engine torque ($T_{E2}$) and modifies the electric motor/generator torque command. This makes it possible to avoid the interference between the drive system and the loading system. It should be noted that the priority may be set by the driver's operation of a lever or the like.

[Control Process of Transmission]

Figure 5:
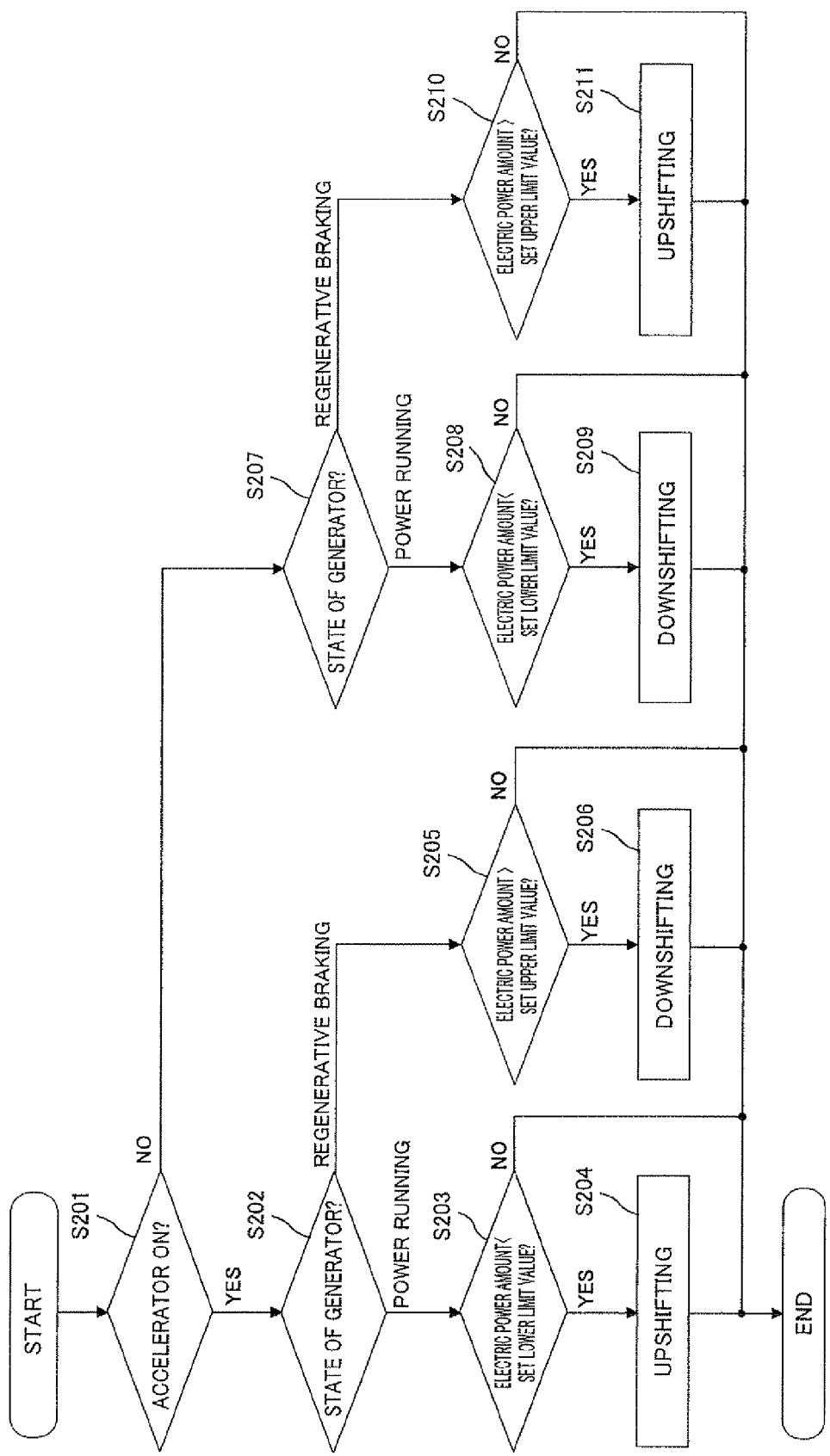
FIG. 5 is a flowchart showing a calculation process of a transmission gear position.

FIG. 5 is a flowchart showing the calculation process of the transmission gear position which is executed by the gear position calculating unit 203b. Turning to FIG. 5, initially, the gear position calculating unit 203b determines whether or not the accelerator has been pressed down (depressed) by the driver (accelerator is turned on) (S201). If it is determined that the accelerator has been pressed down by the driver (YES in S201), the gear position calculating unit 203b determines whether the electric motor/generator 11 is in the regenerative braking mode or in the power running mode (S202).

If it is determined that the electric motor/generator 11 is in the power running mode in step S202 ("power running mode" in S202), the gear position calculating unit 203b determines whether or not the state of charge (SOC) in the electricity calculator 14 is smaller than the set lower limit value (S203). If it is determined that the state of charge (SOC) is not smaller than the set lower limit value, i.e., the state of charge (SOC) is sufficient (NO in S203), the process terminates. On the other hand, if the state of charge (SOC) is smaller than the set lower limit value, i.e., the state of charge (SOC) is deficient (YES in S203), the gear position calculating unit 203b outputs a gear position upshifting command to the transmission 12 (S204).

If the transmission gear position is upshifted in this way, the input shaft rotational speed of the transmission 12 is low even when the output shaft rotational speed of the transmission 12 corresponding to the vehicle speed is the same. Therefore, the rotational speed of the electric motor/generator 11 in the power running mode changes closer to zero, and electric discharging of the electric storage device 14 in the power running mode is suppressed. Of course, when the transmission 12 is already in the highest gear position, upshifting of the transmission gear position is impossible.

If it is determined that the electric motor/generator 11 is in the regenerative braking mode (the electric motor/generator 11 is rotating reversely) in step S202 ("regenerative braking" in S202), the gear position calculating unit 203b determines whether or not the state of charge (SOC) is larger than the set upper limit value (S205). If it is determined that the state of charge (SOC) in the electric storage device 14 is not larger than the set upper limit value, i.e., the state of charge (SOC) is proper (NO in S205), the process terminates. On the other hand, if it is determined that the state of charge (SOC) is larger than the set upper limit value, i.e., the state of charge (SOC) is excessive (YES in S205), the gear position calculating unit 203b outputs a gear position downshifting command to the transmission 12 (S206).

If the transmission gear position is downshifted in this way, the input shaft rotational speed of the transmission 12 is high even when the output shaft rotational speed of the transmission 12 corresponding to the vehicle speed is the same. Therefore, the rotational speed of the electric motor/generator 11 in the regenerative braking mode changes closer to zero, and electric charging of the electric storage device 14 in the regenerative braking mode is suppressed. It should be noted that in the above stall state where the construction machine 1 is shoveling the dirt, etc., the transmission 12 is already in a first gear position and downshifting of the transmission gear position cannot be performed. In this case, the state of charge (SOC) may exceed the set upper limit value and the electric storage device 14 may reach a fully charged state. Therefore, the control for the fully charged state is performed as described later.

If it is determined that the accelerator has not been pressed down by the driver in step S201 (NO in S201), for example, the engine brake is being actuated to decelerate the construction machine 1, the gear position calculating unit 203b determines whether or not the electric motor/generator 11 is in the regenerative braking mode or in the power running mode (S207). If it is determined that the electric motor/generator 11 is in the power running mode in step S207 (power running mode in S207), then the gear position calculating unit 203b determines whether or not the state of charge (SOC) is smaller than the set lower limit value (S208). If it is determined that the state of charge (SOC) is not smaller than the set lower limit value, i.e., the state of charge (SOC) is sufficient (NO in S208), the process terminates. On the other hand, if it is determined that the state of charge (SOC) is smaller than the set lower limit value, i.e., the state of charge (SOC) is deficient (YES in S208), the gear position calculating unit 203b outputs a gear position downshifting command to the transmission 12 (S209).

If it is determined that the electric motor/generator 11 is in the regenerative braking mode in step S207, the gear position calculating unit 203b determines whether or not the state of charge (SOC) is larger than the set upper limit value (S210). If it is determined that the state of charge (SOC) is not larger than the set upper limit value, i.e., the state of charge (SOC) is proper (NO in S210), the process terminates. On the other hand, if it is determined that the state of charge (SOC) is larger than the set upper limit value, i.e., the state of charge (SOC) is excessive (YES in S210), the gear position calculating unit 203b outputs a gear position upshifting command to the transmission 12 (S211).

Even in a state where the engine brake is being actuated, for example, during deceleration, electric charging and electric discharging of the electric storage device 14 are controlled according to the state of charge (SOC) in the electric storage device 14, like the state where the accelerator is being pressed down. In principle, during deceleration, a motion energy of the construction machine 1 is converted into an electric energy and the electric storage device 14 is charged. Comparatively, control is executed to facilitate downshifting of the transmission gear position.

By controlling the engine speed, the torque ratio, and the transmission gear position in the above explained manner, the electric motor/generator 11 is properly switched between the power running mode and the regenerative braking mode according to the state of charge (SOC) in the electric storage device 14, and the construction machine 1 is able to drive while repeating electric charging and electric discharging within a limited electric capacity of the electric storage device 14 as described later.

[Driving Operation of Construction Machine]

Subsequently, the driving operation of the construction machine 1 of this embodiment which occurs under the above explained basic drive system control will be descried with reference to velocity diagrams of the epicyclic gearing.

Figure 6:
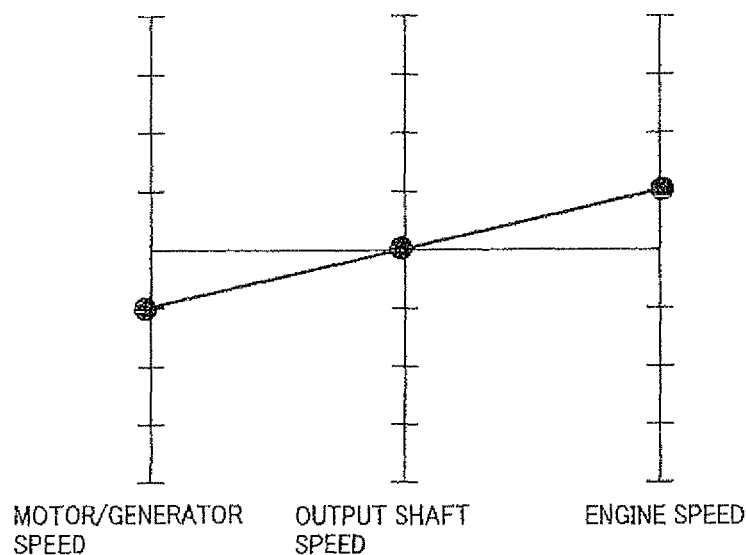
FIG. 6 is a velocity diagram of an epicyclic gearing in an idling state.

FIG. 6 is a velocity diagram of the epicyclic gearing in an idling state. In a case where the construction machine 1 is in a stopped state, the transmission 12 is set in the first gear position, and the engine 10 is running in idling engine speed, the engine torque is substantially zero, and a vehicle body of the construction machine 1 is in a stopped state. Therefore, the rotational speed (output shaft rotational speed) of the carrier 18 of the epicyclic gearing is zero as shown in FIG. 6. In this case, the electric motor/generator 11 is subjected to no load, and is rotated reversely. To be more precise, the engine 10 generates torque corresponding to mechanical friction of the engine 10 and the electric motor/generator 11, to maintain the idling engine speed.

Figure 7:
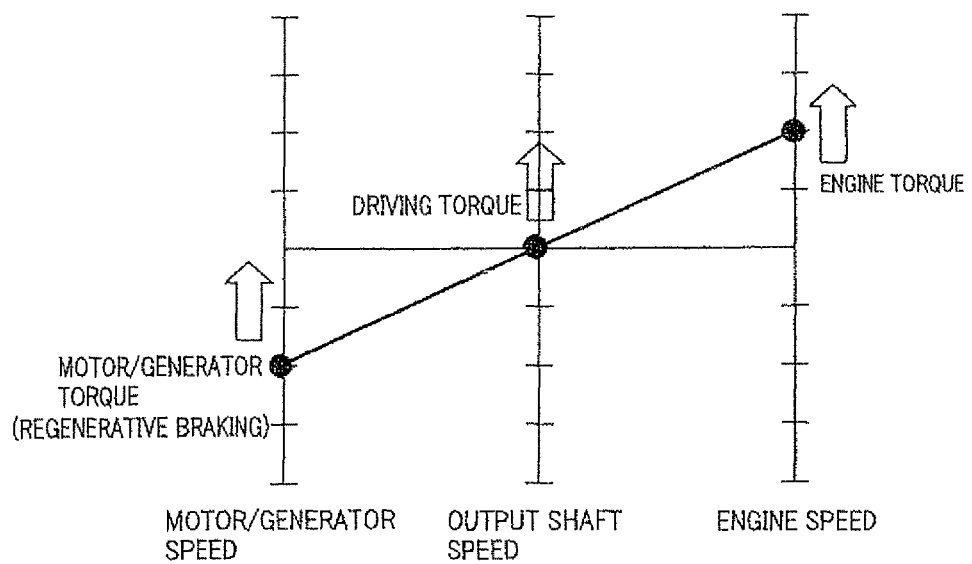
FIG. 7 is a velocity diagram showing a first gear starting state (or in a traction state).

Under this condition, if the driver presses down the accelerator, the torque allocating unit 205 performs allocation of the electric motor/generator torque to be generated in the electric motor generator 11 and the engine torque to be generated in the engine 10. As indicated by white arrows in FIG. 7, desired torque is generated in the electric motor/generator 11 and desired torque is generated in the engine 10. Thereby, torque according to the input from the accelerator is generated at the output shaft of the epicyclic gearing. As can be seen from FIGS. 7 and 8, when the output shaft rotational speed is low, the electric motor/generator 11 generates the torque in a direction opposite to the rotation, and generates the electric power in the regenerative braking mode to charge the electric storage device 14.

By changing the balance (ratio) between the torque to be generated in the engine 10 and the torque to be generated in the electric motor/generator 11, the engine speed and the rotational speed of the electric motor/generator 11 can be controlled. This will be described later with reference to FIGS. 13 to 15.

Figure 8:
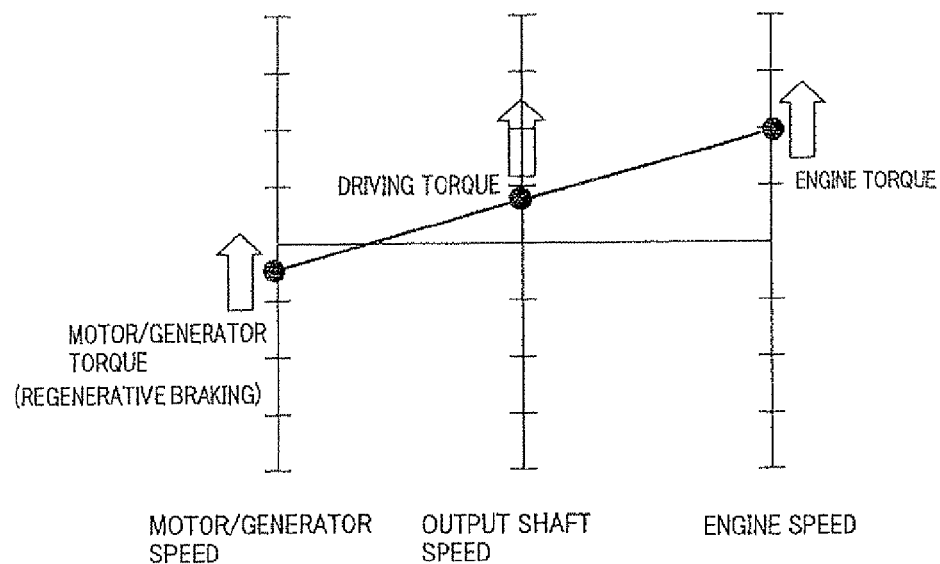
FIG. 8 is a velocity diagram showing a first gear driving state.
Figure 9:
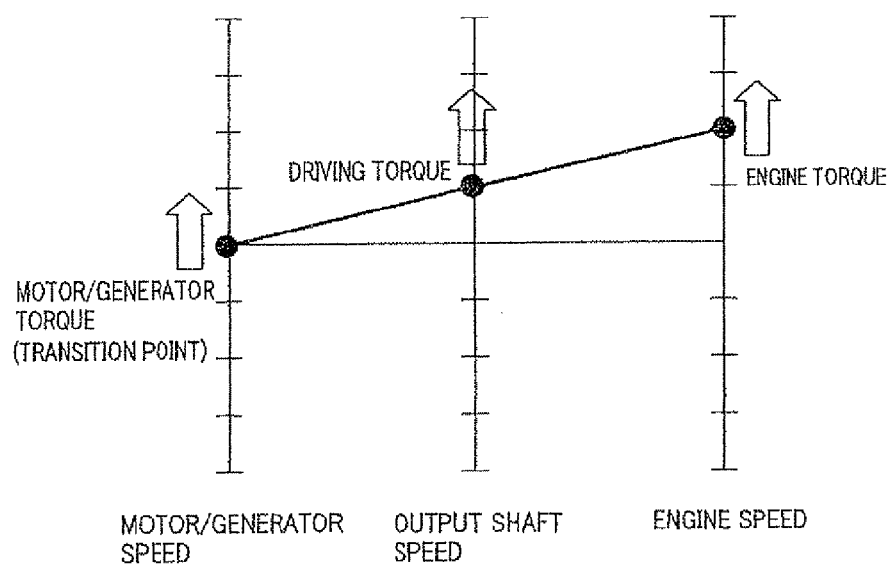
FIG. 9 is a velocity diagram showing a state where the construction machine reaches transition vehicle speed in the first gear driving state.
Figure 10:
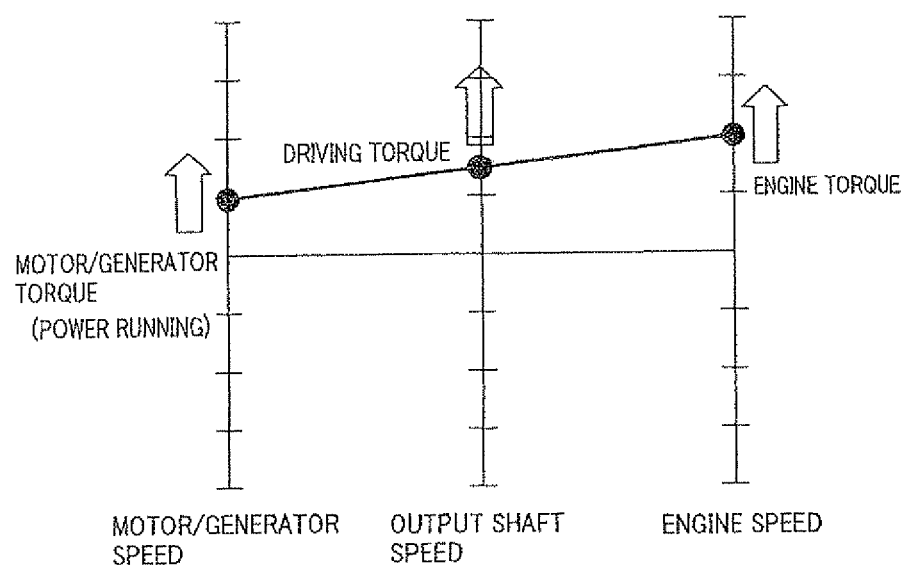
FIG. 10 is a velocity diagram showing a state where the electric motor/generator shifts to a power running mode in the first gear driving state.
Figure 11:
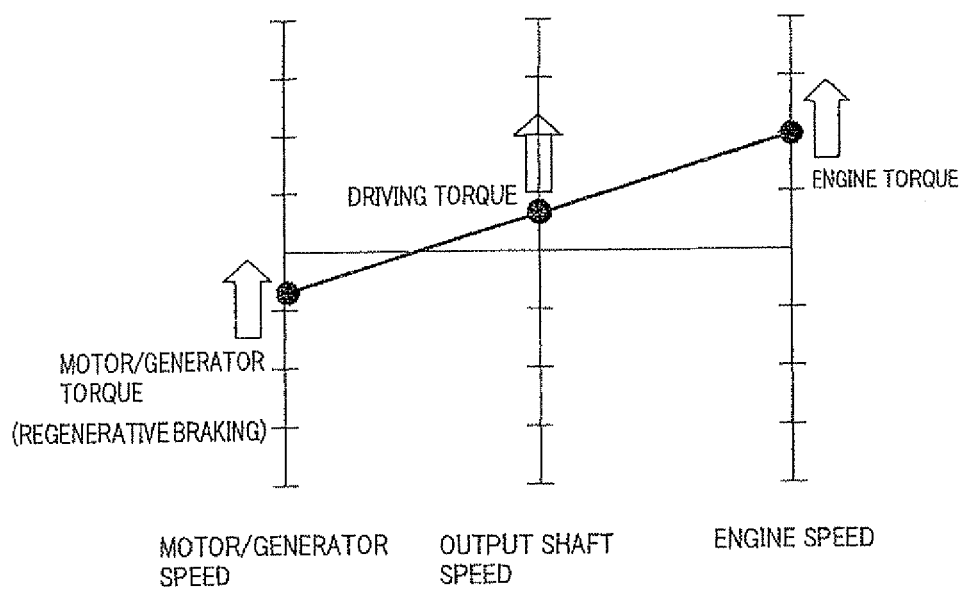
FIG. 11 is a velocity diagram showing a state where a transmission gear position is upshifted to a second gear and the electric motor/generator shifts to a regenerative braking mode.

FIG. 8 shows a state where the construction machine 1 is starting by the torque generated as described above, and the output shaft rotational speed of the epicyclic gearing increases as the vehicle speed increases. In this case, the rotational speed of the electric motor/generator 11 is closer to zero than that during starting shown in FIG. 7. When the vehicle speed further increases, the rotational speed of the electric motor/generator 11 becomes zero as shown in FIG. 9. Then, as shown in FIG. 10, an operational state of the electric motor/generator 11 crosses the transition point and switches from the regenerative braking mode to the power running mode.

Figure 12:
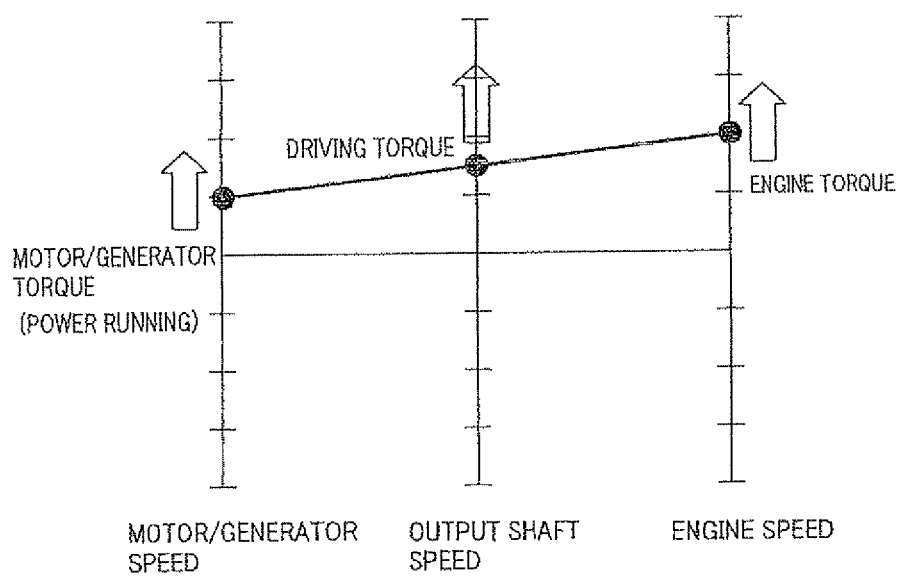
FIG. 12 is a velocity diagram showing a state where the electric motor/generator shifts to the power running mode in the second gear driving state.

In the power running mode of the electric motor/generator 11, the electric storage device 14 is discharged and reduces its state of charge (SOC). At a time point when the state of charge (SOC) reaches the set lower limit value, the gear position calculating unit 203b outputs a gear position upshifting command to the transmission 12 as described above. As a result, the transmission gear position is upshifted, so that the output shaft rotational speed of the epicyclic gearing is decreased. Again, the electric motor/generator 11 rotates reversely in the regenerative braking mode. Thereafter, when the vehicle speed further increases, the electric motor/generator 11 switches to the power running mode as shown in FIG. 12.

[Torque Balance Between Engine Torque and Electric/Motor Generator Torque]

Subsequently, a method of controlling the engine speed and the rotational speed of the electric motor/generator 11 by changing the balance (ratio) between the torque to be generated in the engine 10 and the torque to be generated in the electric motor/generator 11 will be described.

As should be understood from the above illustrated basic second formula of the epicyclic gearing, the torque balance among the shafts of the sun gear 16a, the ring gear 16b and the carrier 18 of the epicyclic gearing is determined in the drive system of the construction machine 1 of this embodiment. If the torque of the engine 10 and the torque of the electric motor/generator 11 are balanced, the engine 10 increases the engine speed and the electric motor/generator 11 increases the rotational speed (the engine 10 and the electric motor/generator 11 increase the output shaft rotational speed), thereby enabling the vehicle body of the construction machine 1 to be accelerated.

If the torque balance between the engine 10 and the electric motor/generator 11 is changed so as to, for example, increase the engine torque, the engine speed increases but the rotational speed of the electric motor/generator 11 decreases. By controlling the engine speed and the rotational speed of the electric motor/generator 11 by changing the torque balance between the engine 10 and the electric motor/generator 11, the construction machine 1 is able to continue driving while repeating electric charging and electric discharging. This will be described specifically with reference to FIGS. 13 to 15.

Figure 13:
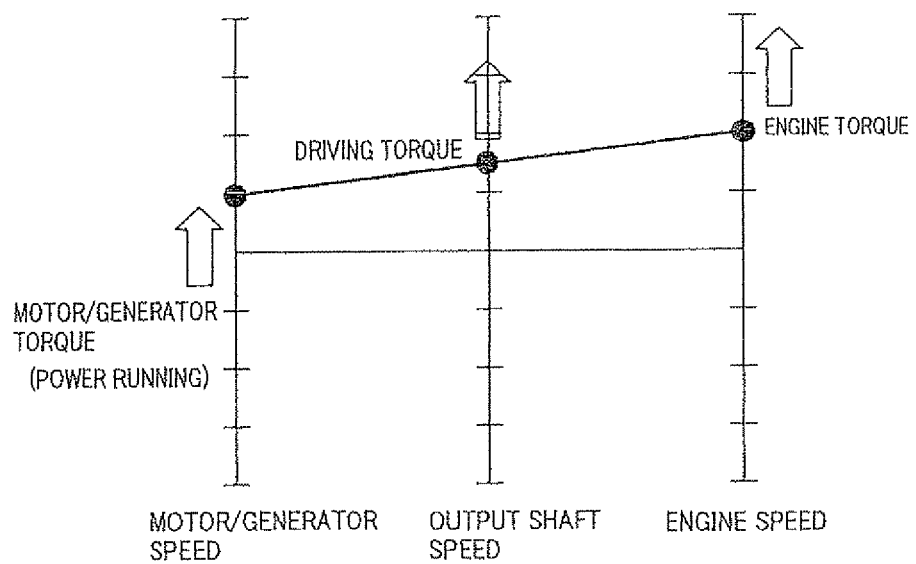
FIG. 13 is a velocity diagram showing a torque balance state where engine torque is relatively smaller.
Figure 14:
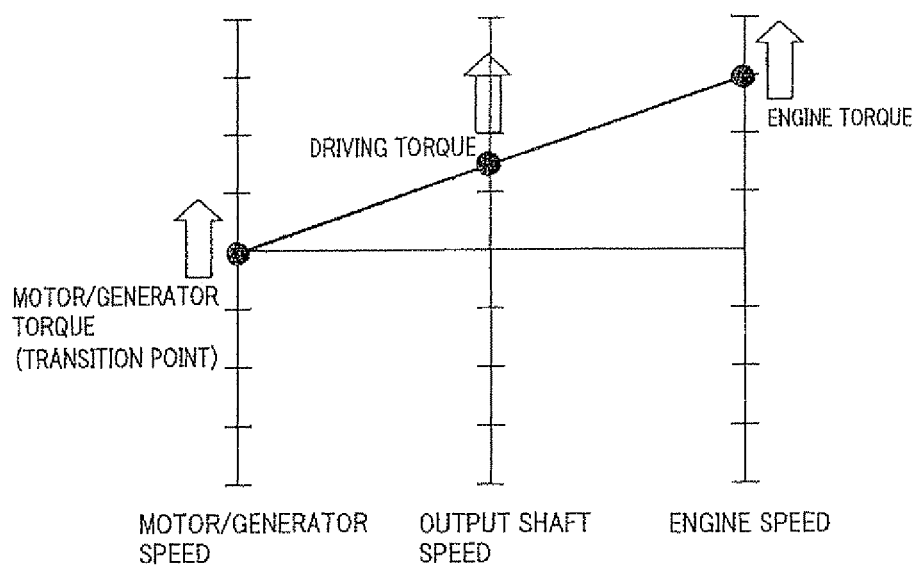
FIG. 14 is a velocity diagram showing a state where the construction machine reaches transition vehicle speed in the second gear driving state.
Figure 15:
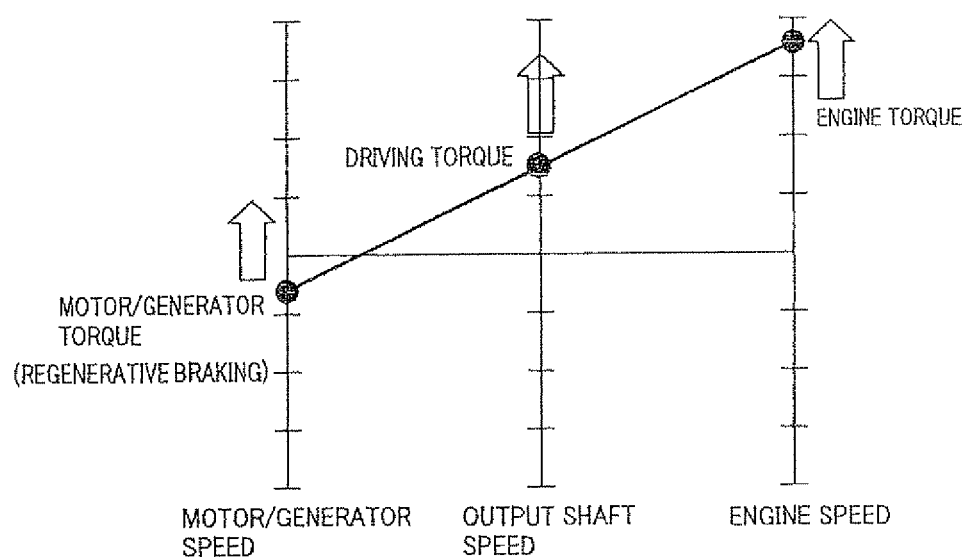
FIG. 15 is a velocity diagram showing a torque balance state where the engine torque is relatively larger.

FIGS. 13 to 15 are exemplary velocity diagrams of the epicyclic gearing during an acceleration state in a second gear position. In the examples shown in FIGS. 13 to 15, the output shaft rotational speed of the epicyclic gearing is equal. As shown in FIG. 14, when the electric motor/generator 11 is at a transition point between the regenerative braking mode and the power running mode, electric charging and electric discharging do not occur. In this state, the engine torque is decreased, and the engine speed decreases, but the rotational speed of the electric motor/generator 11 increases. As a result, as shown in FIG. 13, the electric motor/generator 11 shifts to the power running mode, and the electric storage device 14 is discharged. On the other hand, if the engine torque is increased in the state of FIG. 14, the engine speed increases but the rotational speed of the electric motor/generator 11 decreases. As a result, as shown in FIG. 15, the electric motor/generator 11 shifts to the regenerative braking mode, and charges the electric storage device 14.

As should be understood from the above, even at equal vehicle speed, the electric motor/generator 11 can be placed in the power running mode or the regenerative braking mode depending on the engine speed. Thus, switching between electric charging and electric discharging by electric motor/generator 11 can be performed by controlling the engine speed.

[Driving Characteristic of Construction Machine]

Figure 16:
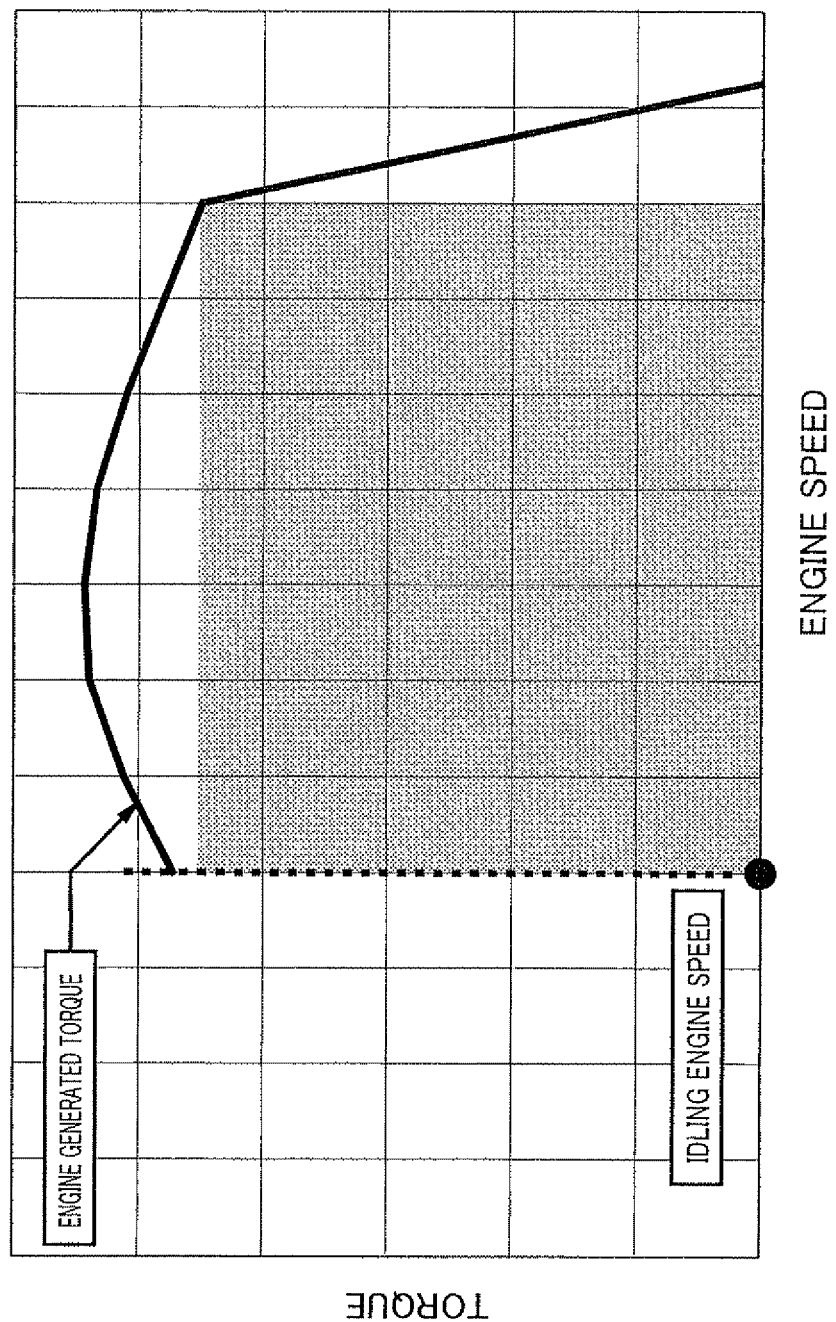
FIG. 16 is a graph showing a relationship between engine speed and torque of the engine.

Subsequently, the above described driving characteristic of the construction machine 1 will be described with reference to the driving characteristic view showing the relationship between the vehicle speed and the traction force. FIG. 16 shows a driving characteristic of the engine 10 itself. The engine 10 does not rotate below idling engine speed (or minimum engine speed at which effective torque is generated). Although the engine torque is actually a characteristic indicated by a generated engine torque line in FIG. 16, it is supposed that the engine torque is generated within a hatched range (range in which maximum torque is constant irrespective of the engine speed), to easily create a driving characteristic view as described later.

Figure 17:
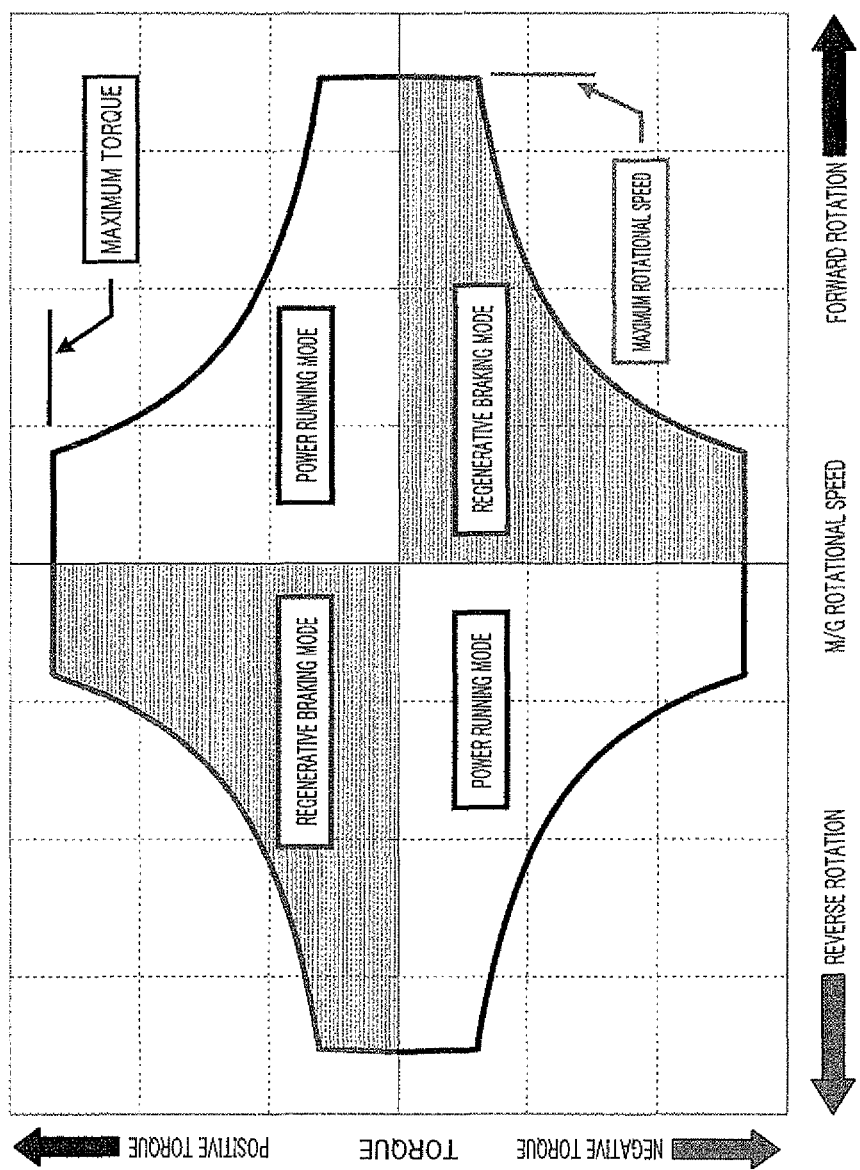
FIG. 17 is a graph showing a relationship between rotational speed and torque of the electric motor/generator.
Figure 18:
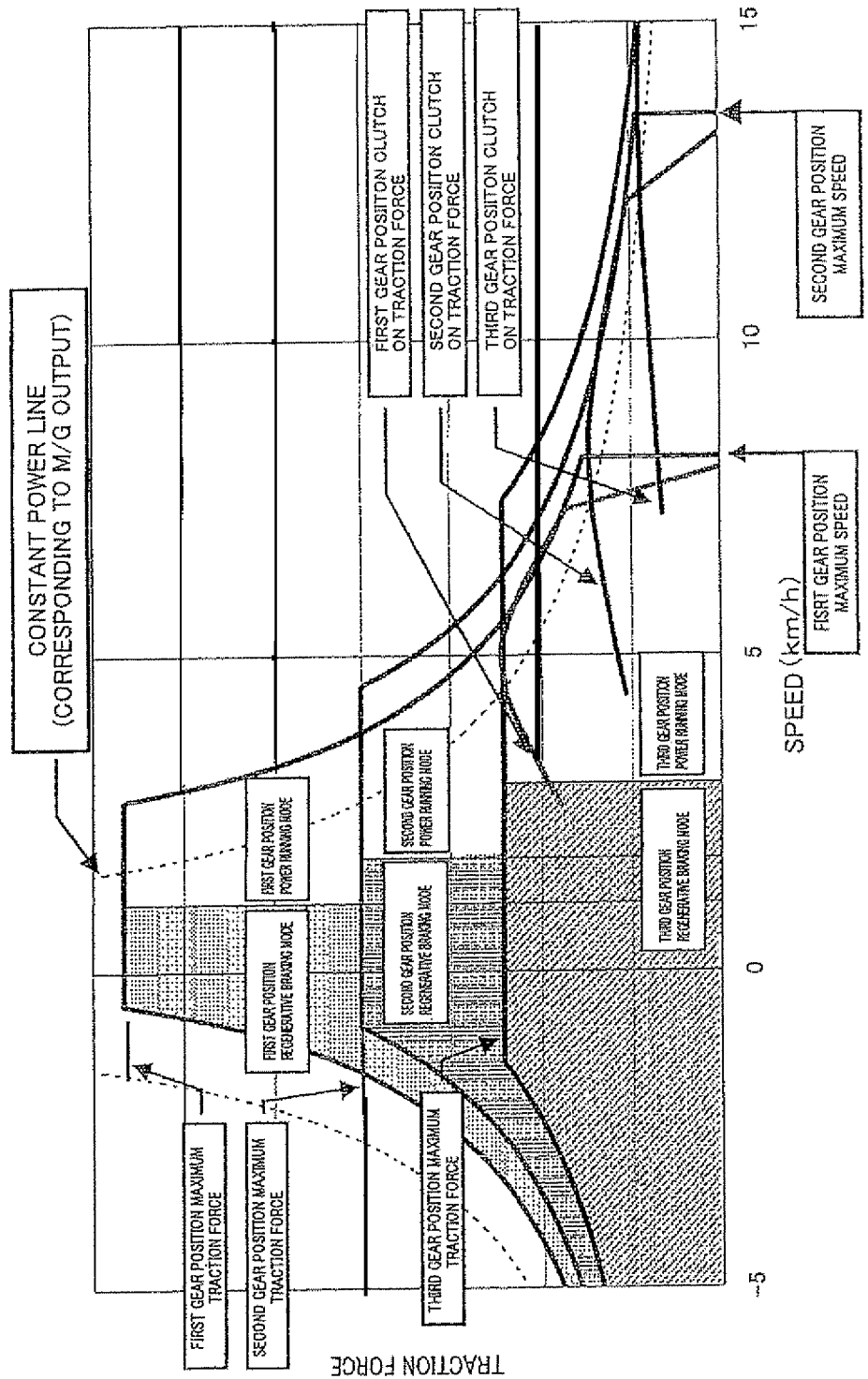
FIG. 18 is a driving characteristic view showing the relationship between the vehicle speed and the traction force in the construction machine according to the embodiment.
Figure 19:
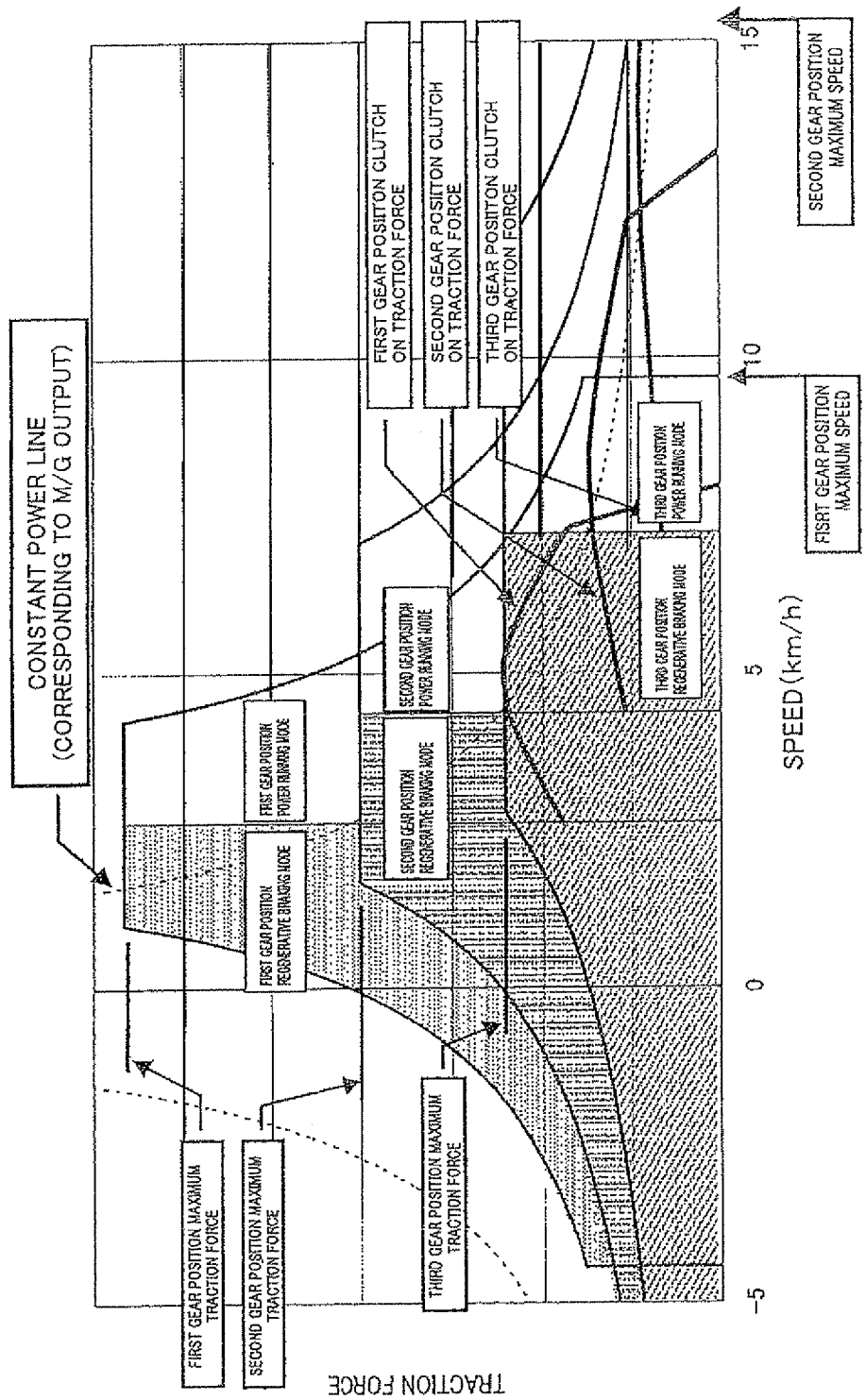
FIG. 19 is a view corresponding to FIG. 18, showing a case where the engine speed is relatively high.

FIG. 17 shows a characteristic of the electric motor/generator 11. As shown in FIG. 17, the electric motor/generator 11 rotates normally and generates normal torque (normal rotation power running), or the electric motor/generator 11 rotates reversely and generates reverse torque (reverse rotation power running). That is, in the power running mode, the electric motor/generator 11 generates torque in a rotational direction. On the other hand, in the regenerative braking mode, the electric motor/generator 11 rotates normally and generates the reverse torque, or the electric motor/generator 11 rotates reversely and generates the normal torque. That is, in the regenerative braking mode, the electric motor/generator 11 generates torque in a direction opposite to the rotation direction FIGS. 18 and 19 are driving characteristic views each showing the relationship between the vehicle speed and the traction force of the construction machine 1 according to Embodiment 1. FIG. 18 shows a case where the engine speed is low, while FIG. 19 shows a case where the engine speed is high. In FIGS. 18 and 19, dotted-lines indicate the outputs of the electric motor/generator 11, and are constant power lines set to be similar to the traction forces corresponding to the first gear position to the third gear position of the conventional torque converter equipped vehicle.

FIG. 18 is created supposing that the engine 10 is able to generate relatively high torque based on a balance of the epicyclic gearing as compared to the maximum torque of the electric motor/generator 11. The maximum traction force in the first gear position, the maximum traction force in the second gear position, and the maximum traction force in the third gear position in FIG. 18 are determined by the maximum torque of the electric motor/generator 11 shown in FIG. 17, and the maximum speed corresponding to the respective gear positions is determined by the maximum rotational speed of the electric motor/generator 11. In FIG. 18, a left half region (hatched region) of the characteristic in each gear position indicates the regenerative braking mode of the electric motor/generator 11 and a right half region thereof indicates the power running mode of the electric motor/generator 11.

As shown in FIG. 18, when the transmission gear position is the first gear position in the construction machine 1 of this embodiment, the construction machine 1 is able to continue to have an equal traction force until it reaches certain speed (about 3 km/h in FIG. 18). When the transmission gear position is upshifted under this condition, the maximum traction force decreases but the maximum speed in the regenerative braking mode increases. For this reason, the construction machine 1 drives while generating the electric power in the regenerative braking mode in a lower transmission gear position, and further drives in the power running mode while consuming the electric power stored in the electric storage device 14 from a speed range in which the electric motor/generator 11 rotates normally. When the state of charge (SOC) in the electric storage device 14 is deficient, the transmission gear position is upshifted and the electric motor/generator 11 shifts to the regenerative braking mode again. The construction machine 1 drives while the electric motor/generator 11 is generating the electric power. In this way, the construction machine 1 of this embodiment can drive while repeating electric charging and electric discharging.

In a case where the construction machine 1 is driving at constant high speed under this condition, the clutch 15 is turned on (engaged) at a time point when the vehicle speed reaches speed (clutch-on speed) at which the clutch 15 can be engaged. As a result, the construction machine 1 drives only using the engine 10. Normally, the clutch 15 may be turned on (engaged) while maintaining a third gear position from the clutch-off state in the third gear position (driving state in which the regenerative braking or the power running of the electric motor/generator 11 is used).

As shown in FIG. 19, when the engine 10 reaches high speed, the traction force parallel-shifts to the high-speed side traction force according to an increase in the engine speed. For example, the maximum traction force in the first gear position is equal to that in a case where the vehicle speed is zero and covers up to about 3 km/h which is the transition point between the regenerative braking and the power running. As can be seen from the constant power line of FIG. 19, the regenerative braking mode from the first gear position to the third gear position covers the vehicle speed up to about 7 km/h. Thus, even when the state of charge (SOC) in the electric storage device 14 is deficient, the speed range covered by the regenerative braking is enlarged by increasing the engine speed, and the construction machine 1 is able to continue driving while generating the electric power.

[Control During Deceleration]

Figure 20:
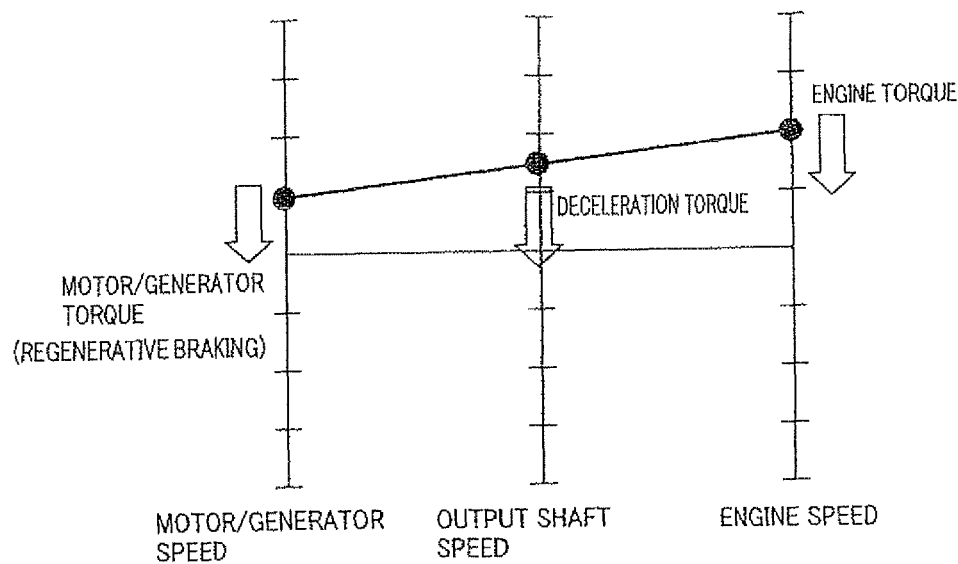
FIG. 20 is a velocity diagram showing a case where the construction machine is decelerated in a state where the electric motor/generator is in the power running mode.
Figure 21:
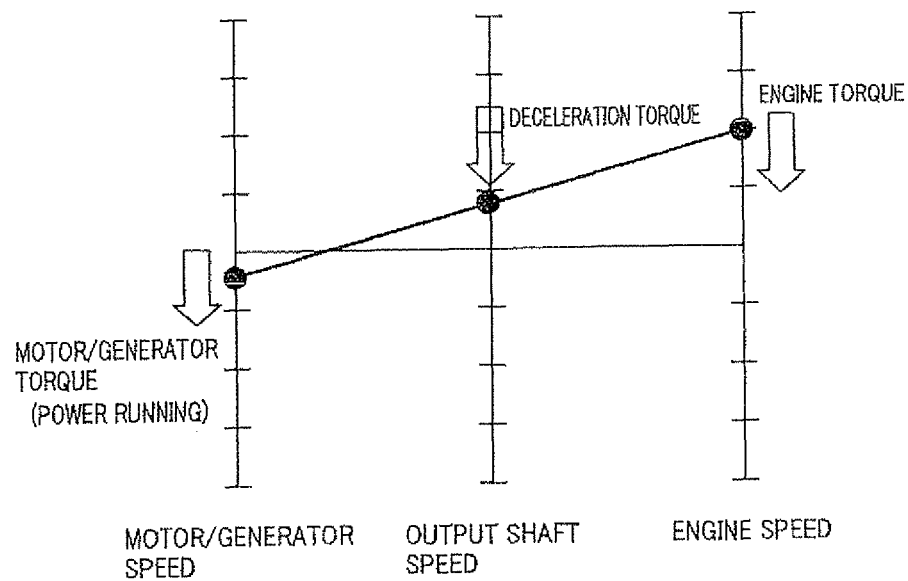
FIG. 21 is a view corresponding to FIG. 20, showing a case where the construction machine is decelerated in a state where the electric motor/generator is in a regenerative braking mode.
Figure 22:
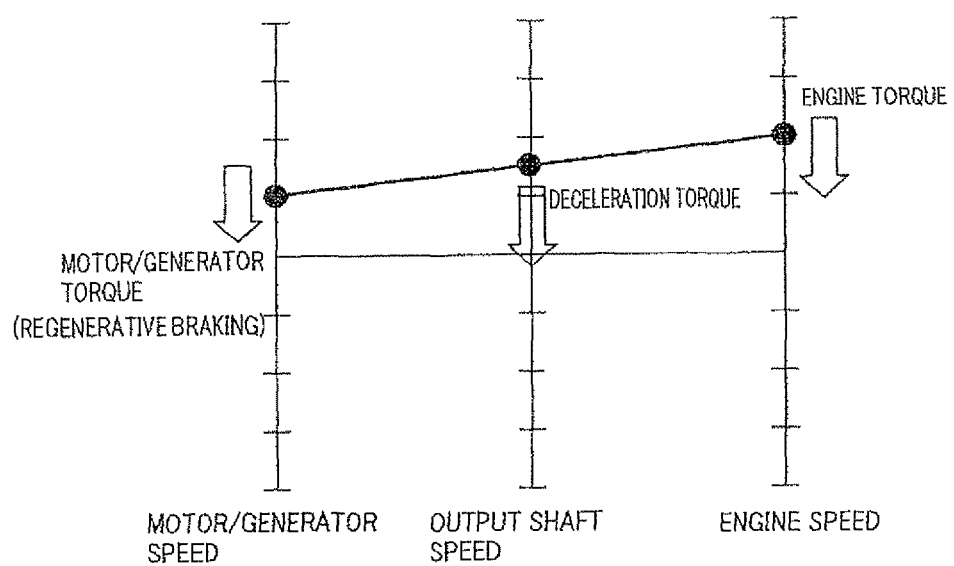
FIG. 22 is a view corresponding to FIG. 20, showing a case where a transmission gear position is downshifted and the electric motor/generator shifts to a regenerative braking mode.

Subsequently, the driving operation of the construction machine 1 of this embodiment during deceleration will be described with reference to FIGS. 20 to 22. FIG. 20 is a velocity diagram showing a case where the transmission 12 is in the second gear position and the construction machine 1 starts to be decelerated in the state where the construction machine 1 is driving with the electric motor/generator 11 being in the power running mode. In this case, as shown in FIG. 20, the construction machine 1 is decelerated while the electric motor/generator 11 is regenerating the motion energy of the construction machine 1 by the regenerative braking and generating the electric power. FIG. 21 is a velocity diagram showing a case where the construction machine 1 is decelerated in the state where the construction machine 1 is driving with the electric motor/generator 11 being in the regenerative braking mode. In this case, as shown in FIG. 21, the construction machine 1 is decelerated while the electric storage device 14 is discharged by the power running executed by the electric motor/generator 11.

In a case where it is necessary to perform electric discharging because the electric storage device 14 is close to a fully charged state, the construction machine 1 may be decelerated in a way as shown in FIG. 21. However, in principle, during deceleration, commonly, the motion energy of the construction machine 1 is converted into the electric energy and the electric storage device 14 is charged. Therefore, the construction machine 1 is preferably decelerated in such a manner that the second gear position is downshifted to the first gear position, and the electric motor/generator 11 transitions from the power running mode to the regenerative braking mode, as shown in FIG. 22.

[Control During Fully Charged State]

A control process in a case where the electric storage device 14 is in a fully charged state will be described with reference to the flow chart of FIG. 23, velocity diagrams of FIGS. 25 to 27, and others. As described above, the construction machine 1 of this embodiment is configured to control the engine speed and the transmission gear position of the transmission 12 according to the state of charge (SOC) in the electric storage device 14 and drive while repeating electric charging and electric discharging within a limited electricity capacity of the electric storage device 14. If a stall state frequently occurs, for example, when the construction machine 1 is shoveling dirt and the regenerative braking operation inevitably continues, the state of charge (SOC) in the electric storage device 14 sometimes reaches a predetermined amount corresponding to the fully charged state.

In such a situation, the construction machine 1 cannot start and drive at very low speed. This is because the output shaft of the engine 10 and the output shaft of the electric/generator motor 11 are coupled to the sun gear 16a of the epicyclic gearing and the ring gear 16b of the epicyclic gearing, respectively, and the electric motor/generator 11 rotates reversely and generates the normal torque (torque in a direction opposite to the rotational direction) in the regenerative braking mode during the period of time from when the construction machine 10 in a stopped state starts until the vehicle speed reaches the transition speed, as described with reference to FIGS. 6 to 9.

In a case where the electric storage device 14 is in or close to the fully charged state, excessive electric charging must be inhibited to protect the electric storage device 14. In this case, therefore, the electric motor/generator 11 is not permitted to generate the electric power in the regenerative braking mode. It may be said that such a failure-to-function state is unique to the hybrid drive system.

To address the above conditions, in this embodiment, at a time point when the electric storage device 14 reaches the fully charged state, the driving gear position of the transmission 12 is switched to the forward or backward driving near position opposite to the current driving direction, and the electric motor/generator 11 is controlled to rotate reversely in the power running, thereby enabling the construction machine 1 to start or drive at very low speed.

Figure 23:
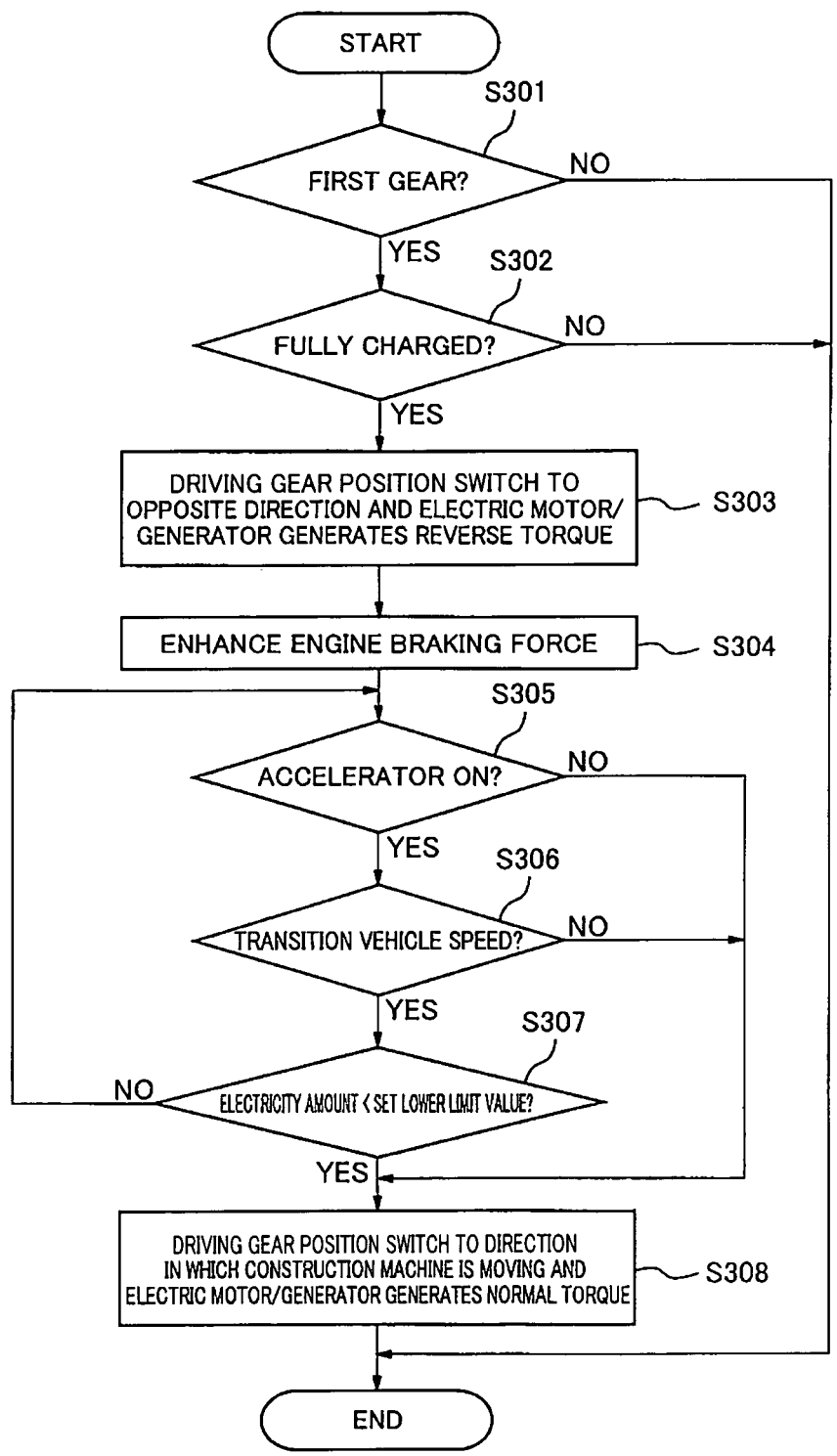
FIG. 23 is a flowchart showing a control routine during a state where the electric storage device is fully charged.

FIG. 23 is a flowchart showing the control process for the above case where the electric storage device 14 is in a fully charged state. This flow is linked with, for example, step S206 as a sub-routine in the flow of the process for calculating the transmission gear position as described with reference to FIG. 5.

To be specific, in step S206 in FIG. 5, i.e., in a state where the accelerator is pressed down, the electric motor/generator 11 is in the regenerative braking mode, and the state of charge (SOC) in the electric storage device 14 is not less than the set upper limit value, the sub-routine in FIG. 23 starts. Initially, the gear position calculating unit 203b determines whether or not the transmission gear position is the first gear (S301). If it is determined that the transmission gear position is not the first gear (NO in S301), downshifting of the transmission gear position is allowed, and therefore, the sub-routine ends (END). The process returns to the flow in FIG. 5, and the gear position calculating unit 203 outputs a gear position downshifting command to the transmission 12.

On the other hand, if it is determined that the transmission gear position is the first gear (YES in S301), downshifting of the transmission gear position is not allowed. Then, it is determined whether or not the electric storage device 14 is in the fully charged state (S302). If it is determined that the electric storage device 14 is not in the fully charged state (NO in S302), the sub-routine ends. At this time, as described above, the electric motor/generator 11 is in the regenerative braking mode and is rotating reversely direction, and the vehicle speed does not reach the transition speed yet. If this state continues, the state of charge (SOC) in the electric storage device 14 further increases up to a predetermined amount corresponding to the fully charged state.

Thereupon, it is determined that the electric storage device 14 is in the fully charged state (YES in S302), and the gear position calculating unit 203 outputs a gear position changing command to the transmission 12 to change the driving gear position to the forward or backward driving gear position opposite to the current driving direction. In addition, the torque allocating unit 205 outputs the electric motor/generator torque command to the electric motor/generator 11 to cause electric motor/generator 11 to rotate reversely in the power running mode (step S303). More specifically, in response to the driving command from the driving torque calculating unit 203a, the torque allocating unit 205 outputs a negative electric motor/generator torque command ($T_M$) to the electric motor/generator 11 to cause electric motor/generator 11 to rotate reversely in the power running mode.

Figure 24:
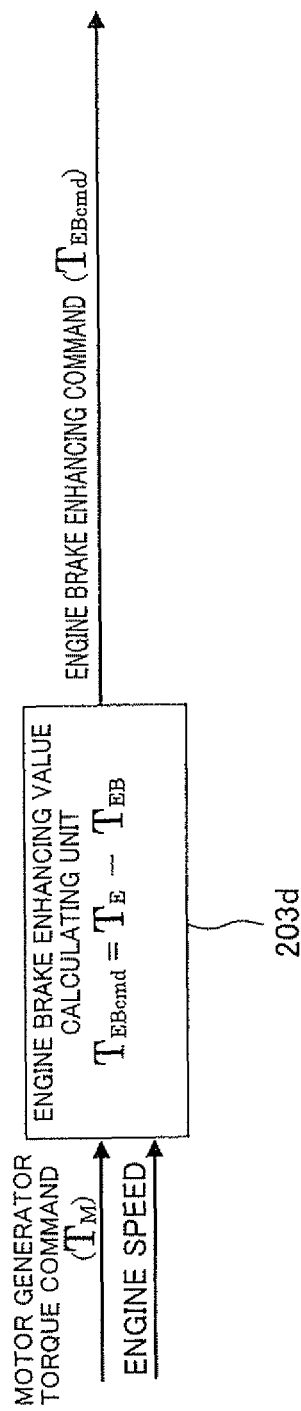
FIG. 24 is a view showing a calculation process of an engine brake enhancing command.

Further, the torque allocating unit 205 outputs a negative engine torque command ($T_E$) to the engine brake enhancing value calculating unit 203d. Receiving the negative engine torque command ($T_E$), the engine brake enhancing value calculating unit 203d outputs an engine brake enhancing command to the resistor controller 51 (S304). To be specific, as shown in FIG. 24, the engine brake enhancing value calculating unit 203d first calculates an engine brake value ($T_{EB}$) of the engine 10 from the engine speed, and subtracts the engine brake value ($T_{EB}$) from the negative engine torque command ($T_E$), thereby deriving an engine brake enhancing value ($T_{EBcmd}$).

As a result of the above calculation process, a rotational resistance of the engine 10, i.e., the engine brake value ($T_{EB}$) and a resistance ($T_{EBcmd}$) generated in the resistor controller 51 become braking torque (engine braking force) generated in the output shaft of the engine 10. That is, at the output shaft of the engine 10, the braking torque of ($T_{EB}-T_{EBcmd}=T_{EB}$) is generated.

Figure 25:
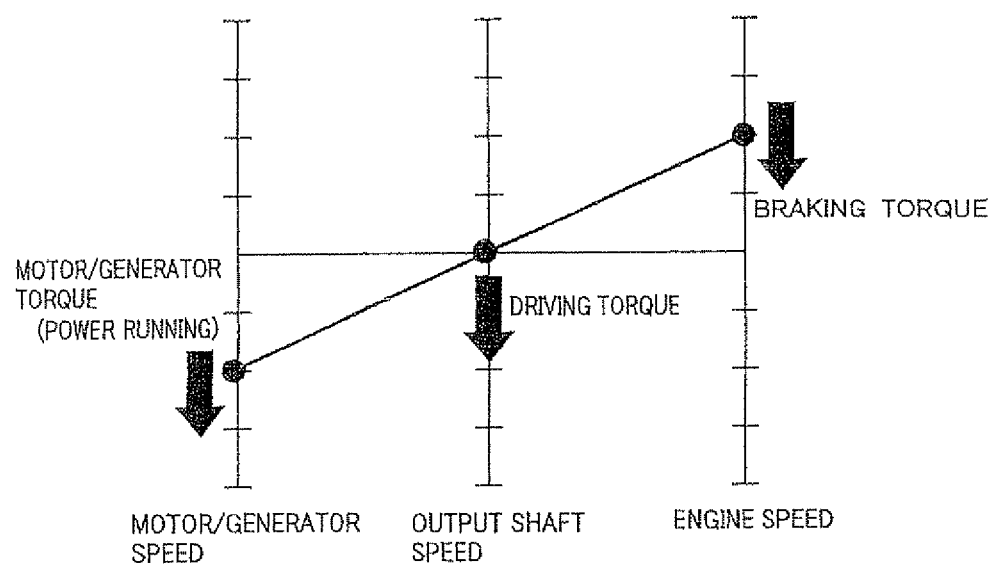
FIG. 25 is a view corresponding to FIG. 7, showing control during a state where the electric storage device is fully charged.
Figure 26:
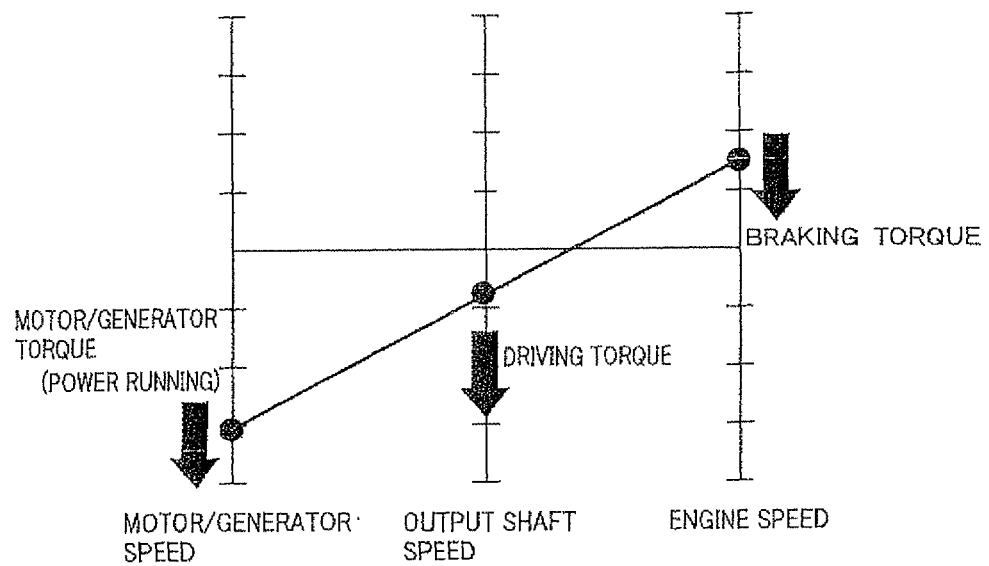
FIG. 26 is a view corresponding to FIG. 8, showing control during a state where the electric storage device is fully charged.

Receiving the negative electric motor/generator torque command, the electric motor/generator 11 generates the reverse torque rotating in the reverse direction as indicated by black arrows in FIGS. 25 and 26, shifts to the power running mode and operates as the electric motor. Because of this, the electric storage device 14 in the fully charged state is discharged. Therefore, a failure-to-function state does not occur. Receiving the negative engine torque command, the resistor controller 51 activates, for example, an electronically-controlled relief valve to regulate an output pressure of the hydraulic pump 41 and causes the hydraulic pump 41 to operate as the resistor, thereby generating braking torque as indicated by black arrows in FIGS. 25 and 26 to suppress the degrees to which the engine 10 revolves up.

Alternatively, the hydraulic pump 41 may be a variable displacement pump. By combining regulation of an output flow rate and regulation of an output pressure, the hydraulic pump 41 is enabled to operate as a resistor having a higher regulating ability.

Since the electric motor/generator 11 generates the reverse torque and the engine 10 generates the braking torque, reverse torque according to the input from an accelerator is generated at the output shaft of the epicyclic gearing as indicated by black arrows in FIGS. 25 and 26. This increases the output shaft rotational speed in a reverse direction. The forward driving gear position or the backward driving gear position of the transmission 12 receiving the rotation of the output shaft of the epicyclic gearing has been reversed. Therefore, the construction machine 1 drives in the direction along which the construction machine 1 is moving. As a result, the vehicle speed of the construction machine 1 increases smoothly in response to the accelerator operation. This, a good driving capability is attained.

Turning back to the flow of FIG. 23, during the state where the forward driving gear position or the backward driving gear position of the transmission 12 has been reversed, and the construction machine 1 is driving while the electric motor/generator 11 is rotating reversely in the power running mode, it is determined whether or not the accelerator has been pressed down (S305). If the accelerator is released (NO in step S305), the driving gear position of the transmission 12 is changed to that corresponding to the direction in which the construction machine 1 is moving, and the electric motor/generator 11 is returned to a state where the electric motor/generator 11 generates the normal torque (S308). Thus, the sub-routine ends. On the other hand, if it is determined that the accelerator has been pressed down (YES in S305), then it is determined whether or not the vehicle speed of the construction machine 1 has reached the above transition vehicle speed, to be precise, the vehicle speed corresponding to a transition point at which the electric motor/generator 11 switches between the regenerating braking operation and the power running operation (step S306).

If it is determined that the vehicle speed has reached the transition vehicle speed (YES in S306), the driving gear position of the transmission 12 is switched to the direction in which the construction machine 1 is moving, and the electric motor/generator 11 is returned to the state where the electric motor/generator 11 rotates normally (S308). Thus, the sub-routine ends. On the other hand, if it is determined that the vehicle speed does not reach the transition vehicle speed yet (NO in S306), then it is determined whether or not the state of charge (SOC) in the electric storage device 14 has reached the set lower limit value (set amount) (S307). If it is determined that the state of charge (SOC) in the electric storage device 14 has not reached the set lower limit value (NO in S307), the process returns to step 5305, and the above process continues. On the other hand, if it is determined that the state of charge (SOC) in the electric storage device 14 has reached the set lower limit value or less (YES in S307). The driving gear position of the transmission 12 is switched to the direction in which the construction machine 1 is moving, and the electric motor/generator 11 is returned to a state where the electric motor/generator 11 generates the normal torque (S308). Thus, the sub-routine ends (END), and the process returns to the flow of FIG. 5.

Subsequently, the driving operation of the construction machine 1 during the above control for the fully charged state will be described with reference to the velocity diagrams of FIGS. 25 to 27. FIG. 25 shows an example in which the construction machine 1 is starting. In this case, the transmission gear position is the first gear, the engine 10 is rotating normally but the vehicle body is in a stopped state. The rotational speed (output shaft rotational speed) of the carrier 18 of the epicyclic gearing is zero, and the electric motor/generator 11 is rotating reversely.

Then, according to the operator's accelerator operation, the electric motor/generator 11 generates the reverse torque, and the engine 10 generates the braking torque, as indicated by black arrows in FIG. 25. Thereby, the reverse torque is generated at the output shaft of the epicyclic gearing. The construction machine 1 starts and moves in the direction selected by the forward/backward driving lever. As the vehicle speed of the construction machine 1 increases, after starting, the output shaft rotational speed of the epicyclic gearing increases in a reverse direction (downward direction in FIG. 26) as shown in FIG. 26. At this time, the electric motor/generator 11 shifts to the power running mode to discharge the electric storage device 14.

Figure 27:
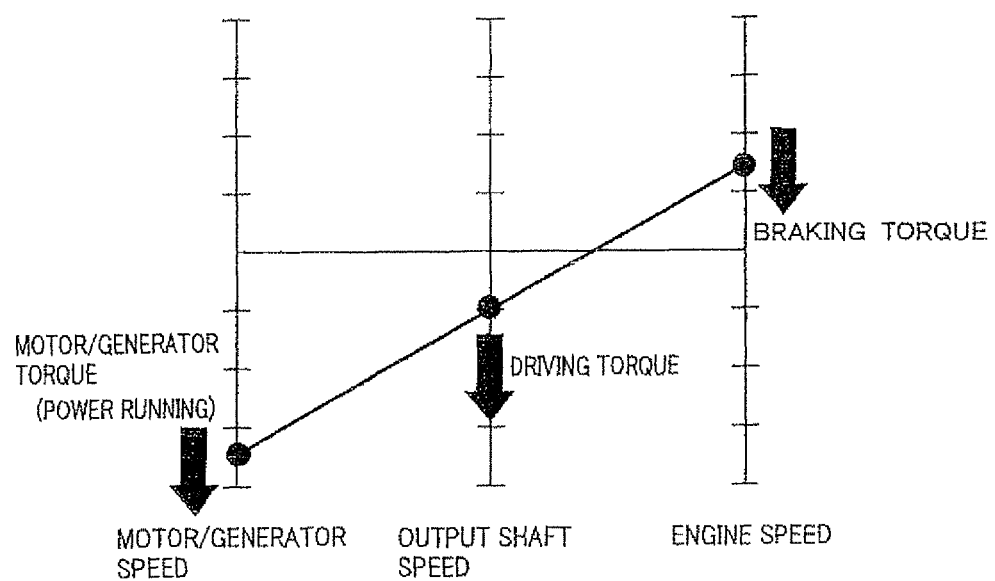
FIG. 27 is a velocity diagram showing a state where the construction machine reaches transition vehicle speed under control during a state where the electric storage device is fully charged.

When the vehicle speed further increases up to the transition vehicle speed, the output shaft rotational speed of the epicyclic gearing is equal in absolute value to that shown in FIG. 9, as shown in FIG. 27. When the driving gear position of the transmission 12 is retuned to the direction in which the construction machine 1 is moving, and the electric motor/generator 11 is switched to a state where the electric motor/generator 11 generates the normal torque, the epicyclic gearing is placed in a state shown in FIG. 9, and the rotational speed of the electric motor/generator 11 becomes zero temporarily. However, the vehicle speed increases quickly and exceeds the transition point as shown in FIG. 10, thereby allowing electric motor/generator 11 to be maintained in the power running mode.

If the vehicle speed does not increase up to the state shown in FIG. 27 but the construction machine 1 continues driving at very low speed and the electric storage device 14 continues to be discharged, the state of charge (SOC) in the electric storage device 14 decreases to the set lower limit value or less. In that case, the driving gear position of the transmission 12 is returned to the direction in which the construction machine 1 is moving in the state shown in FIG. 26, and the epicyclic gearing is placed in the state shown in FIG. 8. At this time, the electric motor/generator 11 is switched to the state where the electric motor/generator 11 generates the normal torque and shifts to the regenerative braking mode, thus charging the electric storage device 14.

When the vehicle speed increases or the state of charge (SOC) in the electric storage device 14 is lessened and the control process during the fully charged state terminates, the above described basic control process for the drive system is executed. In this control, the transmission gear position is switched properly according to the state of charge (SOC) in the electric storage device 14. The construction machine 1 is able to drive while repeating electric charging and electric discharging within a limited electric capacity of the electric storage device 14.

As should be appreciated from the above, by controlling the engine speed and the transmission gear position based on the accelerator opening, the vehicle speed, the state of charge (SOC) in the electric storage device 14, etc., the construction machine 1 is able to drive while repeating electric charging and electric discharging within a limited electric capacity of the electric storage device 14. For example, an electric storage device is required to have very high input/output densities to meet requirements of charging and discharging electric power in the electric motor/generator in the wheel loader and similar construction machines. In the present moment, the electric storage device with very high input/output densities is limited to, for example, a capacitor with a relatively low energy density, and its electricity capacity is not sufficiently large. Under the circumstance, the construction machine 1 of this embodiment is very useful.

In addition, the construction machine 1 of this embodiment can start even in a state where the electric storage device 14 is fully charged and drive at very low speed, and does not become a failure-to-function state, which state sometimes tends to occur in a hybrid drive system in the fully charged state. For example, the wheel loader and similar construction machines accelerate and decelerate repeatedly at low speed and tend to become a stall state frequently. Correspondingly, the electric motor/generator 11 inevitably becomes the regenerative braking mode frequently, and the electric storage device 14 is more likely to get fully charged. In light of this, the construction machine 1 of this embodiment is very useful.

The above described embodiments are merely exemplary and are not to be construed as limiting the present invention, and applications and uses of the present invention. For example, although the resistor controller 51 is provided between the hydraulic pump 41 drivably coupled to the engine 10 and the loading/steering system hydraulic circuit 43 to control the output flow rate and output pressure of the hydraulic pump 41, thereby controlling a magnitude of an engine braking force of the engine brake, an engine brake control unit may be constituted by various mechanisms such as an electromagnetic clutch, a fluid joint, and etc.

Furthermore, the configuration of the epicyclic gearing configured to composite the driving power of the engine 10 and the driving power of the electric motor/generator 11 is merely exemplary and the direct-coupling clutch 15 may be omitted, from the epicyclic gearing. Moreover, the basic control for the drive system executed by the controller 2 is merely exemplary and is not intended to limit the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A construction machine comprising:
an electric motor/generator coupled to an electric storage device, the electric motor/generator including an output shaft and being configured to generate a driving power;
an engine configured to generate a driving power;
a drive wheel;
including an output shaft, the epicyclic gearing compositing the driving power output from the electric motor/generator and the driving power output from the engine, and outputting a composite driving power to the drive wheel via the epicyclic gearing output shaft, the epicyclic gearing being configured to cause the electric motor/generator output shaft to rotate reversely if the epicyclic gearing output shaft is not rotating during running of the engine;
a transmission provided on a driving power transmission path between the output shaft of the epicyclic gearing and the drive wheel, and configured to switch between a forward driving gear position and a backward driving gear position;

an accelerator configured to be actuated manually; and a controller for controlling the engine, the electric motor/generator and the transmission, based on at least: 1) actuation of the accelerator, and 2) a state of charge in the electric storage device, such that if: 1) the electric storage device is in a substantially fully charged state in which the state of charge is not less than a predetermined amount, and 2) the accelerator is actuated manually, then the controller controls: 1) the transmission to switch the driving gear position, and 2) the electric motor/generator to generate reverse torque in a power running mode so that the output shaft of the epicycle gearing rotates reversely.

2. The construction machine according to claim 1, further comprising:

an engine brake control unit for controlling a magnitude of an engine braking force;

wherein the controller is configured to cause the engine brake control unit to enhance the engine braking force when switching the driving gear position of the transmission to the forward or backward driving gear position opposite to the direction in which the construction machine is moving.

3. The construction machine according to claim 2, wherein the engine brake control unit is configured to control at least an output pressure of a hydraulic pump drivably coupled to the engine to control the magnitude of the engine braking force.

4. The construction machine according to claim 1, wherein the controller is configured to switch back the driving gear position of the transmission to the direction in which the construction machine is moving, and cause the electric motor/generator to generate normal torque in the regenerative braking mode, when the state of charge in the electric storage device decreases to a predetermined set amount or less, in a state where the driving gear position of the transmission is switched to the forward or backward driving gear position opposite to the direction in which the construction machine is moving.

5. The construction machine according to claim 2, wherein the controller is configured to switch back the driving gear position of the transmission to the direction in which the construction machine is moving, and cause the electric motor/generator to generate normal torque in the regenerative braking mode, when the state of charge in the electric storage device decreases to a predetermined set amount or less, in a state where the driving gear position of the transmission is switched to the forward or backward driving gear position opposite to the direction in which the construction machine is moving.

6. A method of controlling a construction machine including:

an electric motor/generator coupled to an electric storage device, the electric motor/generator including an output shaft and being configured to generate a driving power;

an engine configured to generate a driving power;

a drive wheel;

an epicyclic gearing including an output shaft, the epicyclic gearing compositing the driving power output from the electric motor/generator and the driving power output from the engine, and outputting a composite driving power to the drive wheel via the epicyclic gearing output shaft, the epicyclic gearing being configured to cause the electric motor/generator output shaft to rotate reversely if the epicyclic gearing output shaft is not rotating during running of the engine;

a transmission provided on a driving power transmission path between the output shaft of the epicyclic gearing and the drive wheel, and configured to switch between a forward driving gear position and a backward driving gear position;

an accelerator configured to be actuated manually; and a controller for controlling the engine, the electric motor/generator and the transmission, based on at least: 1) actuation of the accelerator, and 2) a state of charge in the electric storage device; the method comprising:

switching the driving gear position of the transmission to the forward or backward driving gear position opposite to a direction in which the construction machine is moving, and causing the output shaft of the epicyclic gearing to rotate reversely such that the electric motor/generator generates reverse torque in a power running mode if the electric storage device is in a fully charged state in which the state of charge is not less than a predetermined amount and the accelerator has been pressed down by a driver.

7. The method according to claim 6, wherein the construction machine further includes an engine brake control unit for controlling a magnitude of an engine braking force, the method comprising:

enhancing the engine braking force using the engine brake control unit when the controller switches the driving gear position of the transmission to the forward or backward driving gear position opposite to the direction in which the construction machine is moving.

8. The method according to claim 6, comprising: switching back the driving gear position of the transmission to the direction in which the construction machine is moving, and causing the electric motor/generator to generate normal torque in the regenerative braking mode, using the controller, when the state of charge in the electric storage device decreases to a predetermined set amount or less, in a state where the driving gear position of the transmission is switched to the forward or backward driving gear position opposite to the direction in which the construction machine is moving.

9. The method according to claim 7, comprising: switching back the driving gear position of the transmission to the direction in which the construction machine is moving, and causing the electric motor/generator to generate normal torque in the regenerative braking mode, using the controller, when the state of charge in the electric storage device decreases to a predetermined set amount or less, in a state where the driving gear position of the transmission is switched to the forward or backward driving gear position opposite to the direction in which the construction machine is moving.

* * * * *